(12) United States Patent
Ferrara et al.

(10) Patent No.: US 11,006,182 B2
(45) Date of Patent: May 11, 2021

(54) SURF MODE FOR STREAMED CONTENT

(71) Applicant: Home Box Office, Inc., New York, NY (US)

(72) Inventors: Jason S. Ferrara, Lincoln Park, NJ (US); Brandon C. Furtwangler, Issaquah, WA (US); Cathrynn E. Toshach, Seattle, WA (US)

(73) Assignee: HOME BOX OFFICE, INC., New York, NY (US)

( * ) Notice: Subject to any disclaimer, the term of this patent is extended or adjusted under 35 U.S.C. 154(b) by 0 days.

(21) Appl. No.: 16/223,775

(22) Filed: Dec. 18, 2018

(65) Prior Publication Data

US 2020/0059698 A1 Feb. 20, 2020

Related U.S. Application Data

(60) Provisional application No. 62/718,877, filed on Aug. 14, 2018.

(51) Int. Cl.
*H04N 5/445* (2011.01)
*H04N 21/482* (2011.01)
(Continued)

(52) U.S. Cl.
CPC ..... *H04N 21/4821* (2013.01); *H04N 21/4622* (2013.01); *H04N 21/4826* (2013.01);
(Continued)

(58) Field of Classification Search
CPC ........... H04N 21/4821; H04N 21/4622; H04N 21/4826; H04N 21/8549; H04N 21/4383;
(Continued)

(56) References Cited

U.S. PATENT DOCUMENTS 5,828,839 A * 10/1998 Moncreiff ................. G07F 7/00
709/204
6,163,345 A * 12/2000 Noguchi ............... H03J 1/0016
348/563
(Continued)

OTHER PUBLICATIONS

International Search Report and Written Opinion received for PCT Application Serial No. PCT/US2019/042863 dated Sep. 20, 2019, 14 pages.

*Primary Examiner* — Pankaj Kumar
*Assistant Examiner* — Sahar Aqil Riaz
(74) *Attorney, Agent, or Firm* — Amin, Turocy & Watson, LLP

(57) ABSTRACT

The described technology is generally directed towards a surf mode of operation for streaming content such as video content, in which different content is arranged as different channels though which a user can surf by changing the streaming channels. The starting times of the different content can be staggered. Aspects comprise streaming first content corresponding to a first interactively selectable streaming channel to an output device, receiving a change request to change to a second interactively selectable streaming channel, and in response to the receiving the change request, streaming second content corresponding to the second interactively selectable streaming channel to the output device.

19 Claims, 15 Drawing Sheets

(51) Int. Cl.
　　H04N 21/8549　(2011.01)
　　H04N 21/462　(2011.01)
　　*H04N 21/433*　(2011.01)
　　*H04N 21/438*　(2011.01)
　　*H04N 21/643*　(2011.01)
　　*H04N 21/6405*　(2011.01)
　　*H04N 21/472*　(2011.01)

(52) U.S. Cl.
　　CPC ....... H04N 21/8549 (2013.01); *H04N 21/433* (2013.01); *H04N 21/4383* (2013.01); *H04N 21/472* (2013.01); *H04N 21/6405* (2013.01); *H04N 21/64322* (2013.01)

(58) Field of Classification Search
　　CPC ......... H04N 21/64322; H04N 21/6405; H04N 21/472; H04N 21/433
　　USPC .......................................................... 725/39
　　See application file for complete search history.

(56) References Cited

U.S. PATENT DOCUMENTS

| | | | | |
|---|---|---|---|---|
| 9,143,825 | B2* | 9/2015 | Chittella | H04N 21/4384 |
| 9,609,376 | B2* | 3/2017 | Gilberton | H04N 21/25891 |
| 2008/0060010 | A1* | 3/2008 | Kelts | G06F 3/0481 |
| | | | | 725/39 |
| 2009/0249359 | A1* | 10/2009 | Caunter | G06F 9/454 |
| | | | | 719/315 |
| 2010/0079585 | A1* | 4/2010 | Nemeth | H04N 13/337 |
| | | | | 348/54 |
| 2010/0162312 | A1* | 6/2010 | Heilbron | H04N 21/47202 |
| | | | | 725/43 |
| 2010/0169932 | A1* | 7/2010 | Grubb | H04N 21/47202 |
| | | | | 725/61 |
| 2011/0138416 | A1* | 6/2011 | Kang | H04N 21/42208 |
| | | | | 725/39 |
| 2012/0011551 | A1* | 1/2012 | Levy | H04N 7/18 |
| | | | | 725/82 |
| 2012/0081299 | A1* | 4/2012 | Xiao | H04N 21/42224 |
| | | | | 345/173 |
| 2012/0174159 | A1* | 7/2012 | Arte | H04N 21/2668 |
| | | | | 725/46 |
| 2013/0031192 | A1* | 1/2013 | Caspi | H04L 65/1083 |
| | | | | 709/206 |
| 2014/0195675 | A1* | 7/2014 | Silver | H04H 20/18 |
| | | | | 709/224 |
| 2015/0135214 | A1* | 5/2015 | Reisman | H04N 21/4113 |
| | | | | 725/37 |
| 2015/0381798 | A1* | 12/2015 | Yoon | H04M 1/72569 |
| | | | | 455/411 |
| 2016/0057030 | A1* | 2/2016 | Kanoun | H04L 43/028 |
| | | | | 370/328 |
| 2016/0198214 | A1* | 7/2016 | Levy | H04N 21/4316 |
| | | | | 725/43 |
| 2017/0055038 | A1* | 2/2017 | Ho | G06F 3/04883 |
| 2018/0039621 | A1* | 2/2018 | Scronce | G06F 3/04817 |
| 2018/0217718 | A1* | 8/2018 | Lew | H04L 51/14 |
| 2018/0352278 | A1* | 12/2018 | Myers | H04N 21/2668 |
| 2019/0349619 | A1* | 11/2019 | Hou | H04N 21/251 |

* cited by examiner

SURF MODE FOR STREAMED CONTENT

CROSS-REFERENCE TO RELATED APPLICATION

This application is a non-provisional of U.S. Provisional Patent Application No. 62/718,877, filed on Aug. 14, 2018, entitled "SURF MODE FOR STREAMED CONTENT." The entirety of the aforementioned application is hereby incorporated by reference herein.

BACKGROUND

The current model for discovering available content on streaming services is based on users searching for and/or discovering content (e.g., a program such as a movie or television show) within a static catalog of imagery and titles presented in a grid. Once a program is found and selected, the program is played from its beginning.

To encourage more immediate consumption of video, streaming services have been attempting to introduce ways to reduce the amount of time user spend searching and evaluating the typically large amount of content offerings within these large grids. As one example, some services present users with a preview clip of an automatically played video loop or the like that corresponds to the program that is currently focused in the grid, to entice users to begin watching that program.

BRIEF DESCRIPTION OF THE DRAWINGS

The technology described herein is illustrated by way of example and not limited in the accompanying figures in which like reference numerals indicate similar elements and in which.

DETAILED DESCRIPTION

Figure 1:
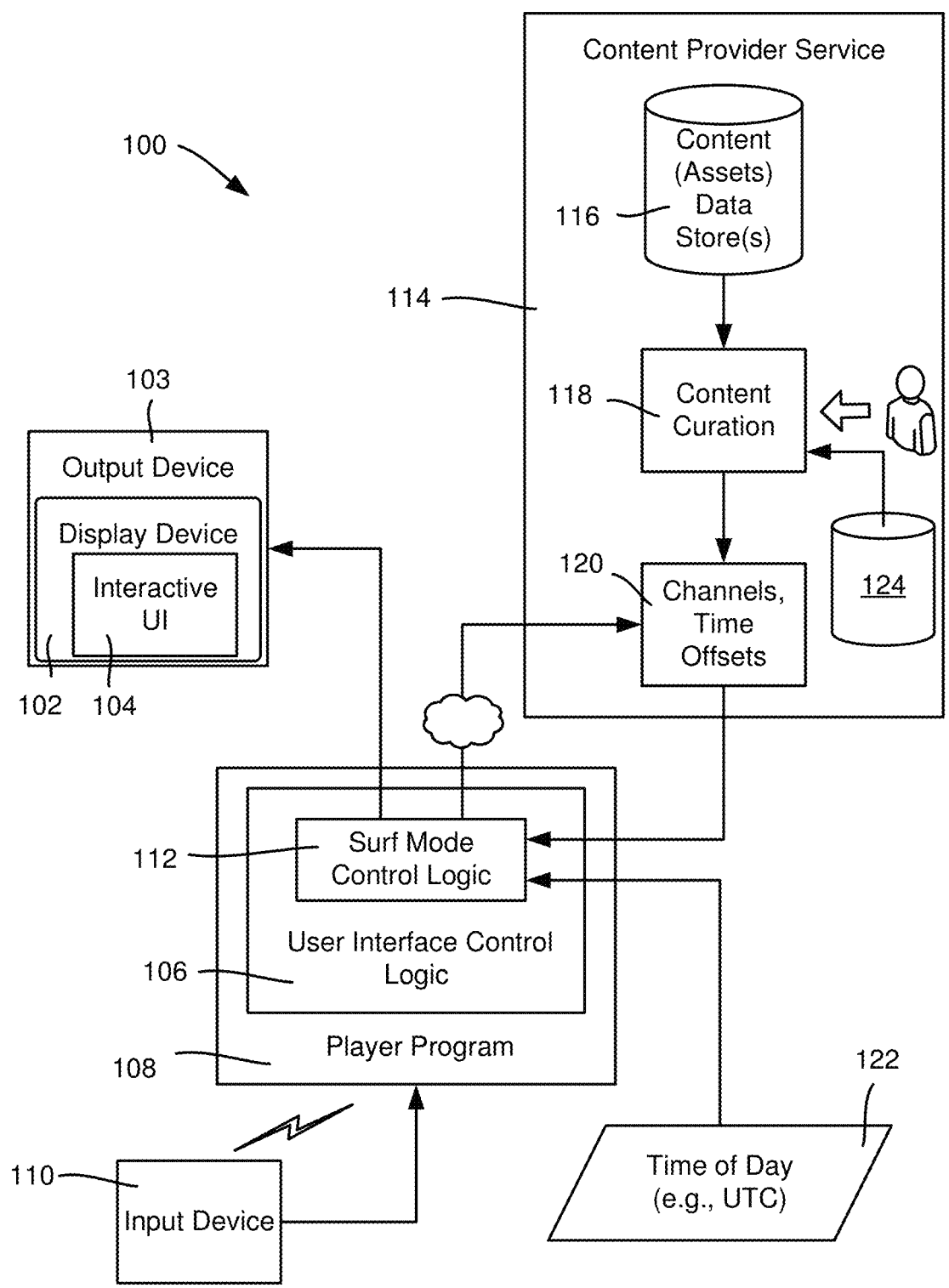
FIG. 1 is a block diagram representation of example components that facilitate content streaming surf mode technology, in accordance with one or more example implementations.

Various aspects of the technology described herein are generally directed towards a surf mode of operation with respect to streaming content, e.g., video content, comprising a user experience that gives users an option to view actual streamed videos as if the streamed videos were live channels through which a user can surf. As described herein, in the surf mode, metadata representing the streamed content videos are arranged as surf mode channels. A user views streamed content in a surf mode channel, and can interact to change the channel, as if the user was surfing through actual live channels. For example, a user can hit a channel down button or the like and scroll from a currently playing (streaming) action movie on a first channel to a currently "playing" (actually streamed) comedy movie on a second channel, and so on.

Moreover, selected content need not be streamed from the beginning, but rather can be arranged to appear to be streaming as if the content (e.g., video) had previously started, as if a user tuned to a live channel. In one or more implementations, the videos are arranged with their actual beginning times staggered relative to the current time, so that a user views any surf mode streamed channel at a location in the video relative to the current time that is not necessarily the starting time. For example, based on the current time, when the user surfs to a streamed video, the user may start viewing that video at a point that is sixty-three minutes and eight seconds into the video; if the user almost immediately changes the channel, the user can see another video at a point that is fourteen minutes and eleven seconds into the other video, and so on. In one or more implementations, this can be accomplished by prearranging each of the various streamed videos that are available for surfing with an associated offset time (e.g., in seconds), as generally described herein The advantages of the video streaming surf mode technology are significant. By way of example, users discover content to watch on streaming services by browsing for such content from directly within a video player program (e.g., an application program or browser coupled to a content-providing service), while that streamed video is seemingly in progress, like a broadcast program. Most users are familiar with traditional channel surfing on linear broadcast devices, and such users are able to quickly navigate directly into watching content and surfing through a video catalog of streamed content that appears to be already in-play, like live broadcast channels.

Thus, the video streaming surf mode technology can surface a large amount of content to users in a short amount of time, in a familiar and low-effort way by which those users can engage with a service's content offerings. The video streaming surf mode technology described herein results in users engaging with streaming content more immediately, e.g., within the application/browser experience, often with a significant reduction in the amount of time spent searching for something to watch. Instead, users spend more time viewing the content, which can result in more frequent future visits to the service for viewing other video content, which in general leads to more revenue to the service.

It should be understood that any of the examples herein are non-limiting. For instance, some of the examples refer to a browser-based video content player, however a dedicated application (e.g., on a smartphone or tablet) can implement the same technology in other environments/implementations. Moreover, the technology can be applied to an audio-only streaming service. As such, the technology described herein is not limited to any particular embodiments, aspects, concepts, structures, functionalities or examples described herein. Rather, any of the embodiments, aspects, concepts, structures, functionalities or examples described herein are non-limiting, and the technology may be used in various ways that provide benefits and advantages in computing and content selection and presentation in general.

FIG. 1 is a block diagram representing an example system 100 of components that can be used to implement various aspects of the technology described herein. A display device 102 of an output device 103 renders a representation of an interactive user interface (UI) 104. Although not explicitly shown, audio output (whether alone or in conjunction with video output) is typically output from the output device 103 which can include internal or external speakers/headphones or the like coupled thereto. As described herein, the interactive user interface 104 is controlled by user interface control logic 106 of a content (video and/or audio) player program 108, based on user input via an input device 110. Part or all of the input device 110 may be integrated (e.g., as a touch-screen input device) with the interactive user interface 104. Note that the input device 110 may comprise any wired and/or wireless device or combination of devices suitable for entering information into a computer program/ logic/device capable of running the player program, including but not limited to, a virtual or physical keypad/keyboard, a microphone, a camera or similar sensor, a remote control (including one originally associated with a television, set-top box, or the like), a gesture detection mechanism, an eye-gaze detection mechanism and so on. For audio-only content, it is feasible to not have a display device at all, and rather, for example, to have a microphone for input and speaker(s) for output.

In one or more implementations described herein, the user interface control logic 106 incorporates or is coupled to surf mode control logic 112. When invoked, in this example the surf mode control logic 112 causes content (e.g., video content) to be rendered on the display device 102, and allows for user interaction via a relevant part of the interactive user interface 104, such as to change one surf mode streaming channel to another surf mode streaming channel. Note that as used herein, when video content is output to a display device, audio content typically is output in conjunction with the video content; thus, for example, outputting "video content" or a "video channel" to a display device generally conveys that associated audio content may be output at the same time to a suitable audio output device, although this is not a requirement.

In general, the various pieces of content are made available to users (e.g., customer viewers) from a content provider service 114, comprising one or more data stores 116. For video content, these pieces of content are sometimes referred to herein as video assets, or simply "videos" or "assets." Such video assets can comprise television show episodes, movies, documentaries, and so on. Other non-limiting examples of assets include promotional material, extras (e.g., "behind-the-scenes" videos, "making of" videos, interviews, and the like), user-uploaded videos, advertisements, audio-only content, and so on. Such content can be accessed in any suitable manner, such as via network (e.g., Internet) requests and responses between the player program 108 and the content provider service 114.

A content curation component 118, which may be any combination of manual operations and/or automated processes, assembles a set of metadata corresponding to channels for viewing in the streaming content surf mode as described herein. The content made available in the surf mode can be curated manually by a human (e.g., one or more employees of the service 114), and/or can be determined programmatically, at least to an extent. For example, the content made available in the surf mode can be based on a list of criteria; (for example, a set of criteria can be to select randomly chosen assets in an "Action Movies" category, which did not appear on any schedule for the last month). For another category, a selection criterion can indicate that the content curation component 118 select the most popular movies based on other users' previous selections, which can be put into a "Featured Movies" category, and so on). Note that the themes for surf mode categories, and the assets within those categories, can be manually chosen. Alternatively, the themes may correspond to categories into which assets are already mapped/grouped; for example, some asset such as a romantic comedy movie may have existing associated metadata that indicates the movie belongs to the romantic genre and the comedy genre, and thus can be automatically placed by the content curation component 118 into a "Featured Romantic" content surf mode category or channel, or a "Featured Comedy" content surf mode category or channel, or both.

Moreover, the content curation component 118 can factor in user and/or group profile data/preference data, as well as concepts such as popularity data. In this way, for example, a user who never (or almost never) watches child-oriented programming will not receive child-oriented surf mode channels, but instead can get at least some more customized channels/content based on what the user is likely to find more desirable. Alternatively, (or in addition to channel availability) the arrangement of surf mode channels, categories and/or a starting surf mode channel can be based on profile data/preference data/popularity. Data that can be used for such customization of surf mode channels/categories/ starting channel is represented in FIG. 1 via block 124.

The metadata can be arranged as a data structure that arranges the content assets, e.g., each identified by a system-unique identifier, into respective categories or channels. For example, there can be an "Action Movie" surf mode category, a "Comedy" surf mode category, and so on, with each surf mode category comprising a list of the asset identifiers currently belonging to that surf mode category. A category can correspond to a single channel, or there can be more than one channel in a category, e.g., five channels, each typically corresponding to a different asset, can be within a "Featured Movie" category. It is alternatively the same general concept to consider a category to be a category channel, with one or more sub-channels, each sub-channel streaming an asset in its category channel.

In order to simulate actual channel surfing, in one or more implementations a time offset is associated with each asset (or channel), as represented in FIG. 1 by the data structure 120, e.g., as a two-dimensional array similar to a television channel grid. The time offset data is used in conjunction with the current time 118 (e.g., Coordinated Universal Time, abbreviated UTC, such as in seconds) to determine the starting point of that asset, which corresponds where to start playing/streaming relative to the current time (block 122). One current implementation synchronizes users globally by operating on a UTC time-of-day offset, expressed as seconds past 12:00 am UTC. This pairs with a list of "channels", which each include up to twenty-four hours of scheduled content in a linear list. Lists with under twenty-four hours of content can repeated to fill the twenty-four hours block (for example, a promo/trailers channel).

In this way, the assets can be staggered in time via their respective time offsets to simulate randomness in the user experience and also reduce the amount of simultaneous start and end times between assets of similar lengths. Then, when a user accesses a channel, a straightforward lookup in the two-dimensional array provides the time offset, e.g., All_Programming[Channel_Name][Current_UTC_Time-of-day_Offset]. In an alternative implementation in which categories are category channels and assets are sub-channels within a category channel, the lookup can be in a data structure such as All_Programming[Category_Channel_Name][AssetID][Current_UTC_Time-of-day_Offset].

As another benefit of basing the streamed playback location in the content on UTC, (instead of for example local time), different users across different time zones surf to and view content from the same location in the asset at the same time. Thus, for example, a first user in one time zone communicating with a second user in another time zone can declare something like "select the Action Channel now, my favorite scene is coming up," and when the surf mode Action Channel is selected by the second user, the second user views the same video in synchronization with the first user who was already watching that video. Note that such synchronization is based on no playback interaction by the users; if concepts such as pause, fast-forward and rewind are allowed and performed within a streamed surf mode asset, then synchronization is not likely to be present.

Figure 2:
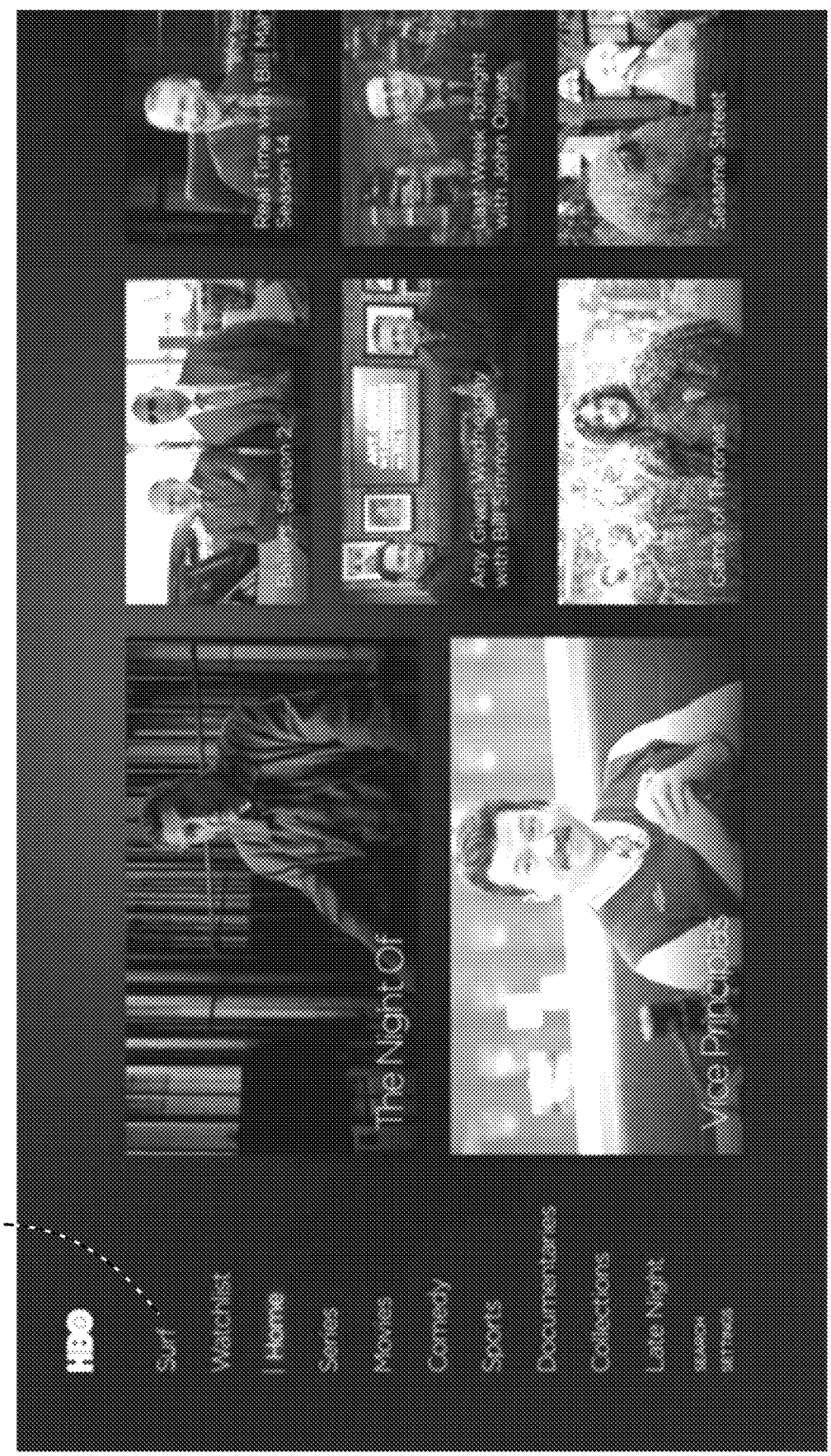
FIG. 2 is a representation of an example interactive interface by which content streaming surf mode operation can be invoked, in accordance with one or more example implementations.

FIG. 2 shows an example of how one instance of an initial interactive user interface screen 220 of the player program 108 (FIG. 1) may be presented to users, e.g., on the display device 102. Note that in FIG. 2, a "Surf" menu item 222 is present among the interactive navigation user elements when a user starts up the player program 108 (browser connected to a service, or an application program) or the like that allows for streaming content selection.

Figure 3:
FIG. 3 is a representation of an example interactive interface when content streaming surf mode operation has been invoked, in accordance with one or more example implementations.

In FIG. 3, in a later example instance of the interactive user interface screen 320, a user navigates up to the "Surf" menu item, which is now-focused menu item 322. In one or more implementations, directly upon the "Surf" menu item having focus, a default (or otherwise) selected in-progress video asset begins playing (streaming) in a main area of the user interface, e.g., with the navigation user elements remaining as an overlay. Additional information may be overlaid above (or placed alongside, e.g., below) the main screen 320, such as the title and rating of the video currently being played. The overlaid menu items and information can fade out or otherwise disappear over time so as to not annoy the user who decides to continue watching from that point on; alternatively or in addition to, the user can manually turn off the overlaid menu items and information. Note that some optional indication that the user is still in the surf mode may be provided, e.g., a mostly transparent logo such as indicating "HBO® Surf Mode" may appear in a corner of the display screen.

It should be noted that streaming of content can occur entirely on the main screen 320, on a smaller portion of the main screen, extended beyond a single screen, and so forth. Moreover, options such as picture-in-picture, split screen, split view, windowing and so forth can be used in conjunction with the technology described herein.

Figure 4:
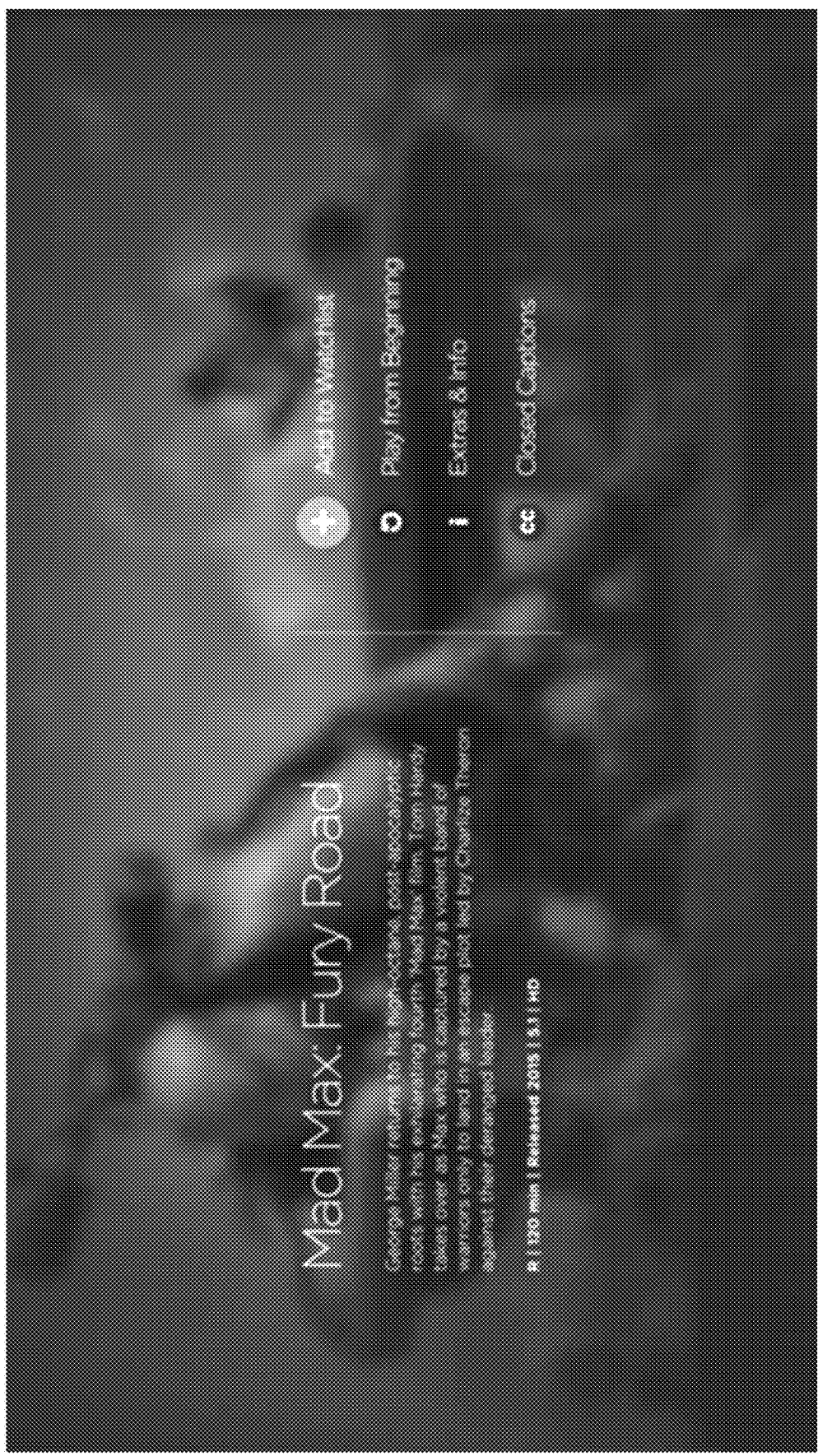
FIG. 4 is a representation of an example interactive interface overlay that can be presented to a user during content streaming surf mode, in accordance with one or more example implementations.

FIG. 4 shows an example screen representation instance 420 when a user has entered the surf mode and triggers another, surf mode overlay that provides additional information about the current asset being streamed. The presentation of this surf mode overlay can be automatic upon selecting the surf mode (e.g., after focus, select enter or the like), or can be by another technique, e.g., using a suitable command (e.g., via a button, keyboard key, verbal command or the like) entered into the surf mode control logic (e.g., 112 FIG. 1) of the device on which the asset is streaming in surf mode. As can be seen, in one or more implementations, the surf mode overlay user interface gives the user the ability (via one or more interactive elements) to perform one or more actions with respect to the currently streaming video. In this example, the exemplified actions are to add the title to the user's watchlist, stream the currently selected/playing asset from the beginning, access extra content or information, and/or turn on (or turn off if already on) closed captioning. Scrolling through the offered menu items and selecting is one way a user can choose among these options, as is having a particular button associated with each item, e.g., "1"-"4" (not shown).

Further, although not explicitly shown, (as with entering the example screen representation instance 420), a straightforward way to turn off the overlay without selection of one of these items can be provided, e.g., a "Back" or "Exit" button, a "Back" or "Exit" menu selection or the like, and so on. This allows the user to view the streamed video from its current point in time without any overlay data.

As described herein, the user has the ability to navigate (e.g., up or down, using cursor keys, channel up down buttons on a remote control, or the like) to change the surf mode category and/or channel. Note that although not explicitly shown, some visual guidance may be given to a user with respect to the surf mode category and/or channel that is currently streaming; e.g., pop-up text and/or a logo can show "Featured Action" when on that category, such as for a short time before fading out or otherwise disappearing (or such text can remain displayed indefinitely, e.g., at the user's option).

Further, the user can navigate (e.g., left or right) to access different in-progress channels within that category, that is, change to a different channel within the current streaming, surf-mode category. Thus, in one or more implementations, the user can locate a desired surf-mode category (e.g., by up or down navigation) and surf through the respective channels (assets) of the newly changed-to category (e.g., by left or right navigation).

Figure 5:
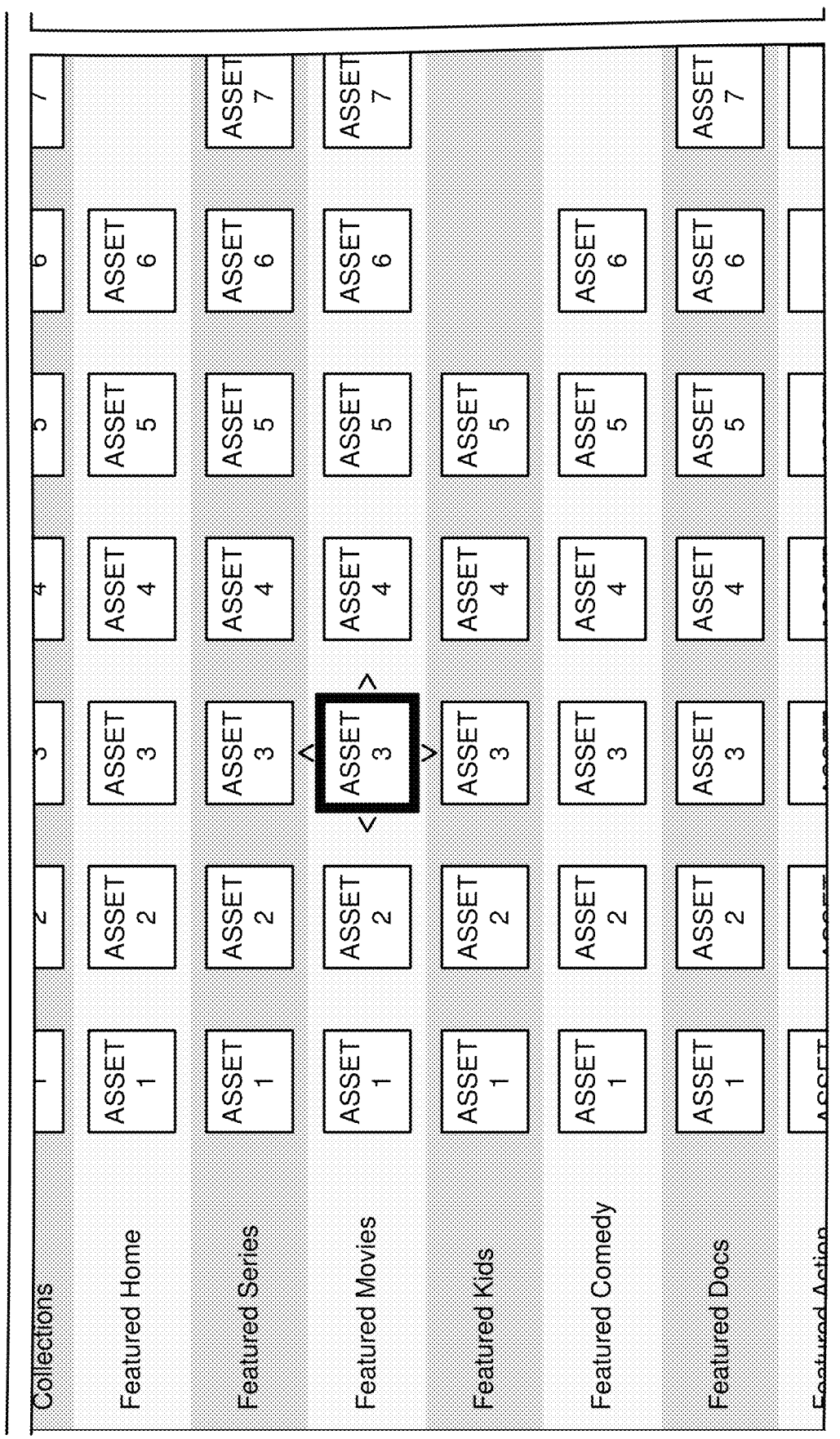
FIG. 5 is an example representation of how content assets can be arranged in categories for interactive selection during surf mode streaming, in accordance with one or more example implementations.

FIG. 5 is an example visual representation of a user's orientation within categories and channels/assets, e.g., relative to their metadata that corresponds to content assets available via the surf mode technology described herein. Note that in one or more implementations, FIG. 5 does not represent any actual user elements displayed to the user, but rather serves as an illustration of how the user can navigate between themed content categories and across channels/assets within that content category. Notwithstanding, in other implementations it is feasible and straightforward to display something such as FIG. 5 as a map to a user to help the user understand the category and channel/asset navigation concepts.

In the example of FIG. 5, a user is currently streaming "ASSET 3" in a "Featured Movies" category. By interaction, such as via cursor buttons or the like, the user can move in one of the directions represented by the arrows surrounding the represented currently selected ASSET 3, e.g., left or right to a different asset (surf to a different channel), e.g., an adjacent channel such as "ASSET 2" or "ASSET 4," respectively, and so on. Note that an asset can be in more than one category, e.g., an action/comedy movie can be in the Featured Action and Feature Comedy category (and possibly in the Featured Movies category as well, and so on). Still further, it is feasible to repeat the same asset within the same category, such as to increase the likelihood of a user surfing to that particular asset; e.g., with the repeated assets having different starting times relative to one another. Further note that the assets represented in FIG. 5 are not intended to show actual asset identifiers, e.g., "ASSET 3" in the Featured Movies" category typically is not the same asset as "ASSET 3" in the Featured Series" category. Still further, a category can have as little as one single asset therein, and thus "grouped" into a category can refer to a category with a single asset or a category with any practical number of assets therein.

Further, by other interaction, the user can move up or down to a different category and an asset/channel therein, e.g., "Featured Series" or "Featured Kids," respectively, and so on. As is understood, the surf mode categories and the assets within a surf mode category can be maintained in one or more data structures, with navigation commands changing indices within the data structures (and/or changing among data structures) to change to a different asset/different category and so on. Note that in the example of FIG. 5 the assets are arranged by category, however this is only one possible implementation, and indeed, surf mode assets/channels may be arranged in any way, including independent of categories, e.g., randomly, by popularity, by release date, and so on, or partially based on category, partially not.

The default starting asset (channel), the order of assets and/or the order of the categories can be selected randomly or arranged by the content provider service 114 (FIG. 1) by an appropriate mechanism, e.g., within the content curation component 118. For example, per-user metadata can be assembled based on the user's past history, so as to select a default channel in a category with a starting asset in which the user is likely more interested in relative to others. Moreover, the categories and/or channels can be arranged so that similar (or more frequently accessed) categories and/or channels are grouped closer to each other; e.g., a user's likely other favorites can be channels nearer the selected "favorite" starting channel for a user. Alternatively, the channel order/asset order can be fixed (for some time such as within a twenty-four hour window) for a group of (or all) users, possibly with a starting asset selected based on each user's past viewing history. Thus, instead of a per-user arrangement, a per-group of user arrangement(s) can be made, e.g., arrange the channels based on overall popularity, start with some selected asset (e.g., randomly or a most popular asset) on a most popular channel, and so on.

Figure 6:
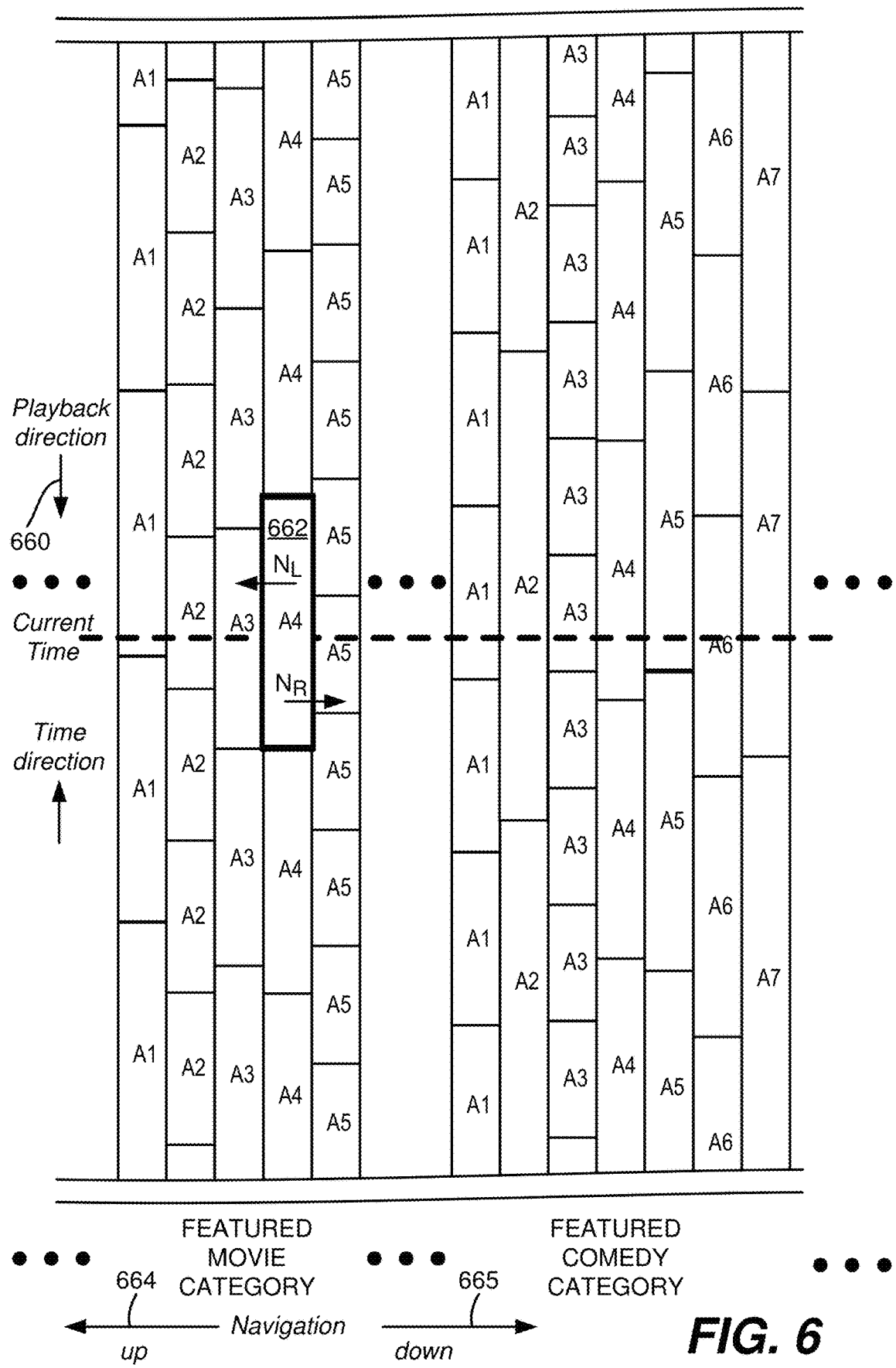
FIG. 6 is an example representation of how content assets can have staggered start times with respect to surf mode streaming, in accordance with one or more example implementations.

Turning to details regarding staggering the starting times of videos, FIG. 6 is a diagram representing how assets (represented as blocks labeled A1. A2 and so on) are arranged to loop, with the starting point based on the asset's related offset data and the current time. In general, when a user activates surf mode, the system loads the time stamps for each asset relative to the current time. It is also feasible to load a time stamp only for the asset that is selected. Another option, described below, is when an asset is already being streamed for other users; the new user can be added to a list of users receiving the streamed content and receive content from the same storage location at the same time as the other users.

Assets continuously progress in real time. For example, the assets can "play downwardly" in FIG. 6 relative to time as indicated by the example playback direction (arrow 660), e.g., time moves upwardly relative to the playback direction. The general concept of 'universal time' ensures that users in different locations see the same asset at the same point in time in order to foster the same communal viewing experience offered by a live broadcast. Note that this applies whenever surfing, but before any pausing, rewinding or fast forwarding or the like within a surf mode streaming asset (if such pausing, rewinding or fast forwarding operations allowed). Note that like FIG. 5, in one or more implementations the concept illustrated in FIG. 6 is not made visible to the user; however like FIG. 5 it is similarly feasible and straightforward to display something resembling a "Channel Guide" corresponding to FIG. 6 that lists programs (surf mode assets) and their respective playing times to again assist the user in selecting surf mode content.

As can be seen, the starting times are intentionally staggered via their time offset data, e.g., randomly or pseudo-randomly. As in FIG. 5, in FIG. 6 moving right (the arrow in highlighted block 662 corresponding to asset A4, labeled navigation right NR) selects a next asset A5 in the category, while moving left (the arrow labeled navigation left NO selects a previous asset A3, each of which start playing/streaming based on the current time and offset. Note that moving up or down does not change to the same asset at a later or earlier time, (an asset plays relative to the current time), but (as in FIG. 5) moving up or down changes the category; that is, moving up or down changes the category of assets between which a user can navigate using left or right navigation. The navigation arrows 664 and 665, labeled "up" and "down," respectively, represent this category change concept to a different category of assets.

The assets can be arranged to loop within a time frame, e.g., repeat every twenty-four hours. Alternatively, a new set of surf mode asset offerings can be pre-generated and become active at a given time, e.g., with the assets arranged so that a user viewing a streamed, running asset continues to view that asset until it ends, even if no longer repeated after that.

Note that one set of content (which becomes a category of assets, or a single channel) can be too small. Attempting to fit assets into something that resembles a television grid (on a conventional television, assets tend to start either on the hour or half hour) can be difficult, as most feature-length movies do not fit into thirty-minute increments.

For Universal Time, twenty-four hour loops can be built, which can repeat for several days. For asset streams/channels with less than twenty-four hours of content, assets can repeat until the twenty-four-hour period is pooled.

When the pool of content does not match a twenty-four hour block, a mechanism to prioritize and select content automatically can be implemented. Options can include inserting a pool of filler content (e.g., promotional material), extras ("behind the scenes" content, "making of" content, etc.), and possibly episodic content well-suited for series promotion, (e.g., the first episode in a series).

Such content can be pre-scheduled so that many viewers access an identical experience, or content can be tailored to the specific viewer. For example, a schedule may include "gaps" that can be filled programmatically, which can be dynamically filled, e.g., based on criteria defined in the system, such as user or group preferences.

In general and as described herein, the assets comprise streaming video content. Note that it is feasible to mix in live programming channels with the surf mode channels. These can include channels that are currently actively carrying programming, e.g., HBO®, HBO Family™, and so on, which if selected can display the actual channel content (yet can be linked to a streamed content asset, if one exists, so that the user can play an asset from the beginning if desired). For an actual live event for which streamed content may not yet be available, e.g., a boxing match, the user cannot replay the content before the starting point. Some distinction may be made in how such a channel is presented to the user, e.g., with a differently-colored overlay as a user interface, or by a notice that replay from the beginning is not allowed/available.

Figure 7:
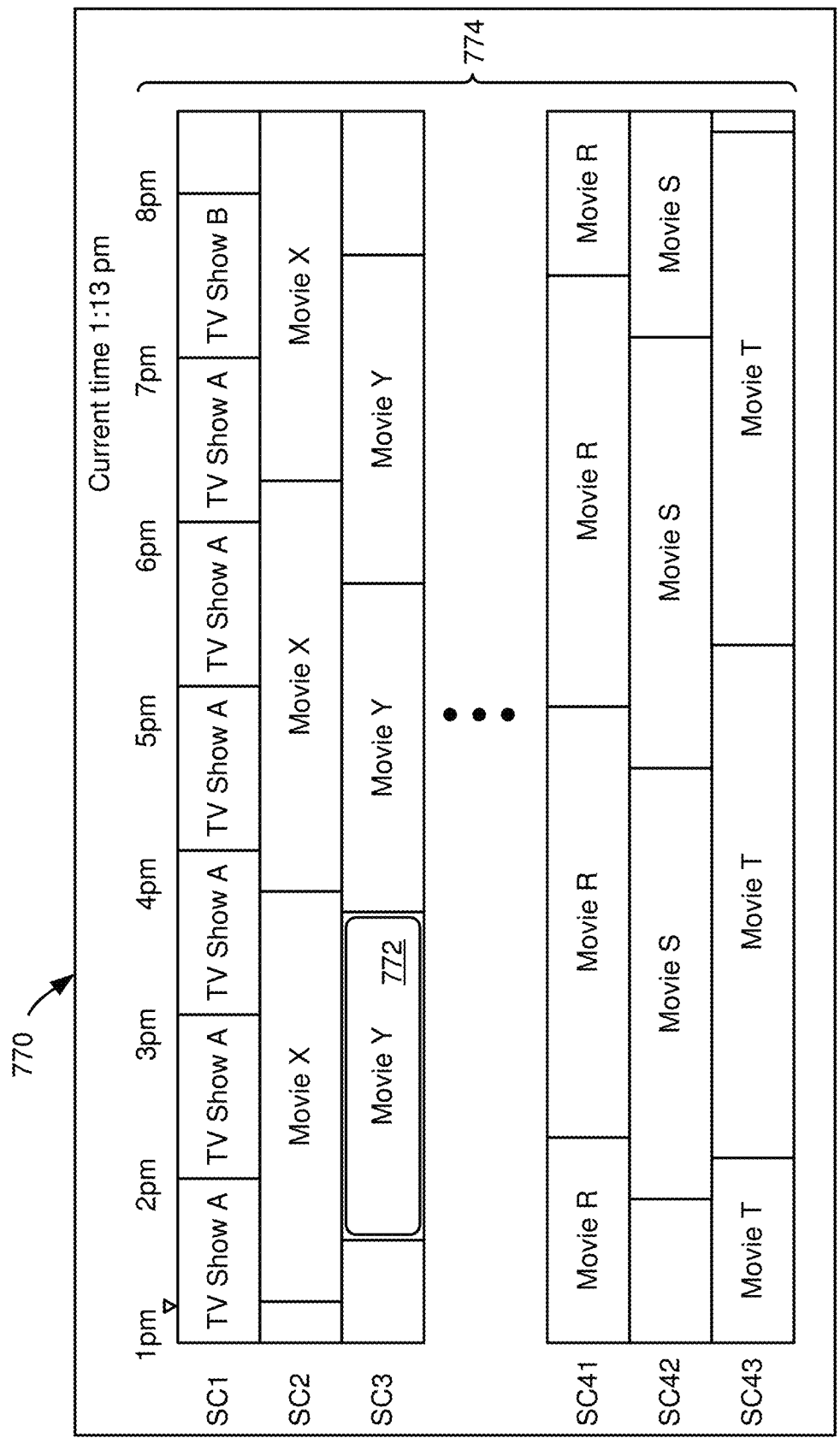
FIG. 7 is an example interactive guide by which a user can view and select streamed content assets, including assets with staggered start times, in accordance with one or more example implementations.

As described above with reference to FIGS. 5 and 6, it is straightforward to display a "Channel Guide" that lists surf mode assets and their respective playing times to again assist the user in understanding the concept of, and possibly selecting, streaming surf mode content. Although feasible to simply display a non-interactive guide, an example interactive guide 770 is exemplified in FIG. 7, e.g., by the shaded selected item 772 (currently on "Movie Y") in an interactive menu part 774 of the guide 770 that can be navigated by user commands. As can be seen, the user can, for example, see and understand how the streamed content channels (SC1-SC43 in this example) are arranged in time, e.g., for the next several hours, relative to the present time. Note that in general the assets repeat in a given streamed channel, however assets within a streamed channel can change over time, e.g., at 7:00 pm, TV show B begins streaming instead of TV show A.

Although not explicitly shown, category labels, different coloring for different categories, and so forth can be used to indicate what category or categories each asset is in. Similarly, a textual or other description (e.g., a thumbnail or small area can show an image or the actual video as being streamed) can be presented in conjunction with the currently selected item 772, such as adjacent or overlaying a portion of the interactive menu part 774 of the guide 770.

Scrolling up and down among the channels can be performed, e.g., the interactive menu part 774 of the guide 770 may not show all available channels at once so as to fit on a display screen. Scrolling forward in time, and possibly backward in time, can be an available interaction(s), as limited by the surf mode logic.

Turning to example operations, FIGS. 8-11 comprise a flow diagram showing how user interaction is processed by the surf mode control logic to present surf mode videos and related information to a user. Note that in these example operations, the surf-mode control logic has become active based on previous user interaction, e.g., corresponding to FIGS. 2 and 3 as described herein.

Operation 802 represents entering the surf mode and selecting a default category and asset, which as described above can be randomly chosen, chosen based on some user or group profile information, and so on. If desired, the categories can be dynamically ordered for this user or user group, and similarly the assets within a category can be dynamically selected and/or ordered for a particular user or group.

Operation 804 represents accessing the time offset data for the currently selected category and/or asset. The asset starting location is determined by the current time relative to the time offset data. Operation 806 represents playing the asset, that is, streaming the appropriate data of the asset from the current time.

It should be noted that with many parallel users, an asset often may be already being streamed to one user at the time another user surfs to that asset. If so, the actions performed at operation 804 can instead recognize the already-playing state and start streaming the new other user with another instance of the same data being streamed to other user(s)/device(s). Indeed, with enough users and resources, it is feasible to be streaming some (or even possibly all) surf mode categories and assets regardless of any actual user's viewing of that asset, in anticipation of at least one user surfing to any given surf mode channel at any given time.

Operation 808 represents waiting for some user interaction. Note that this may be event driven rather than a loop as illustrated, so that for example, the program can be performing other tasks (such as downloading information) while awaiting user interaction.

Figure 8:
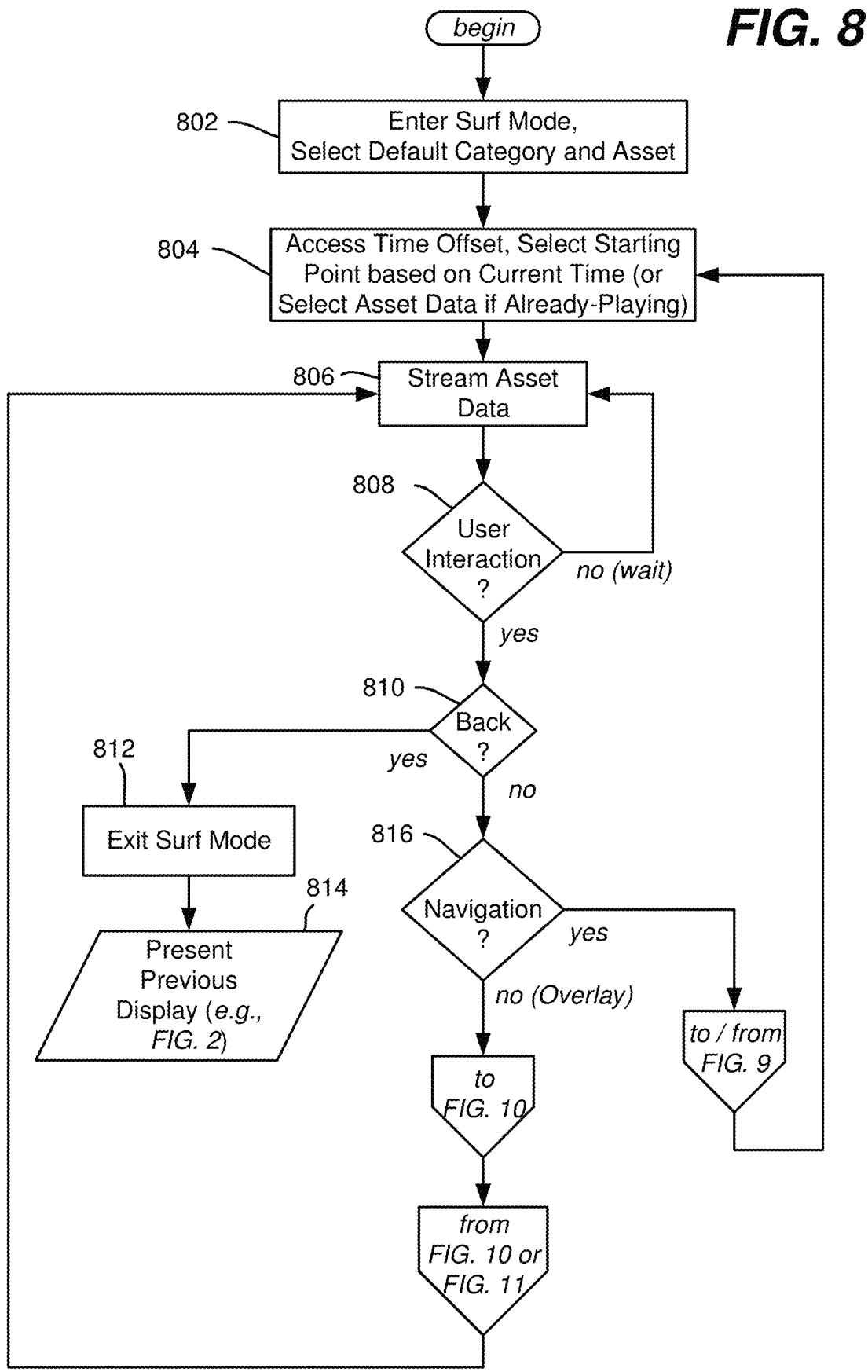
FIGS. 8-11 comprise a flow diagram showing example logic/operations that can be performed based on user interactions during surf mode content streaming, in accordance with one or more example implementations.
Figure 9:
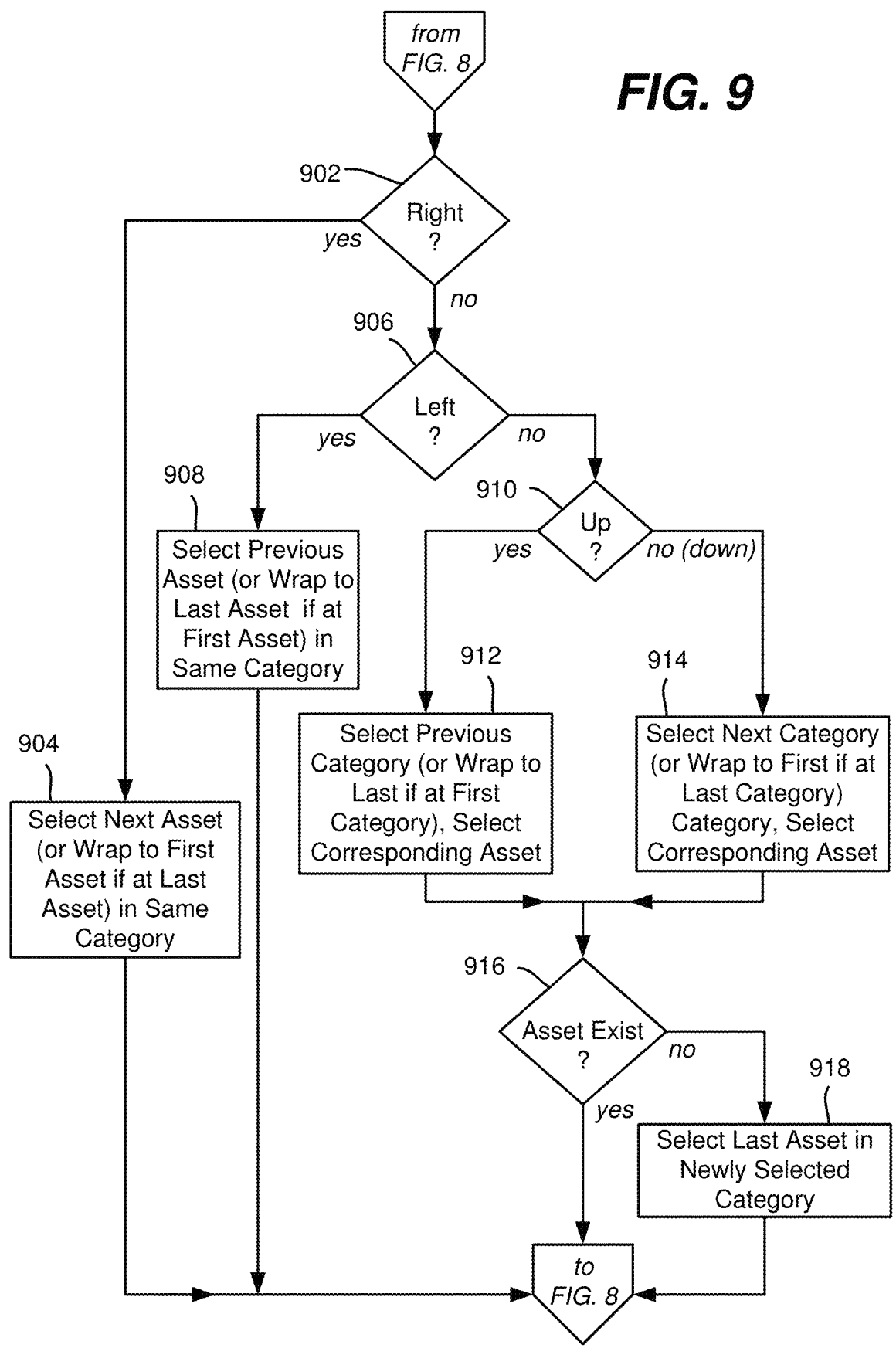
Figure 10:
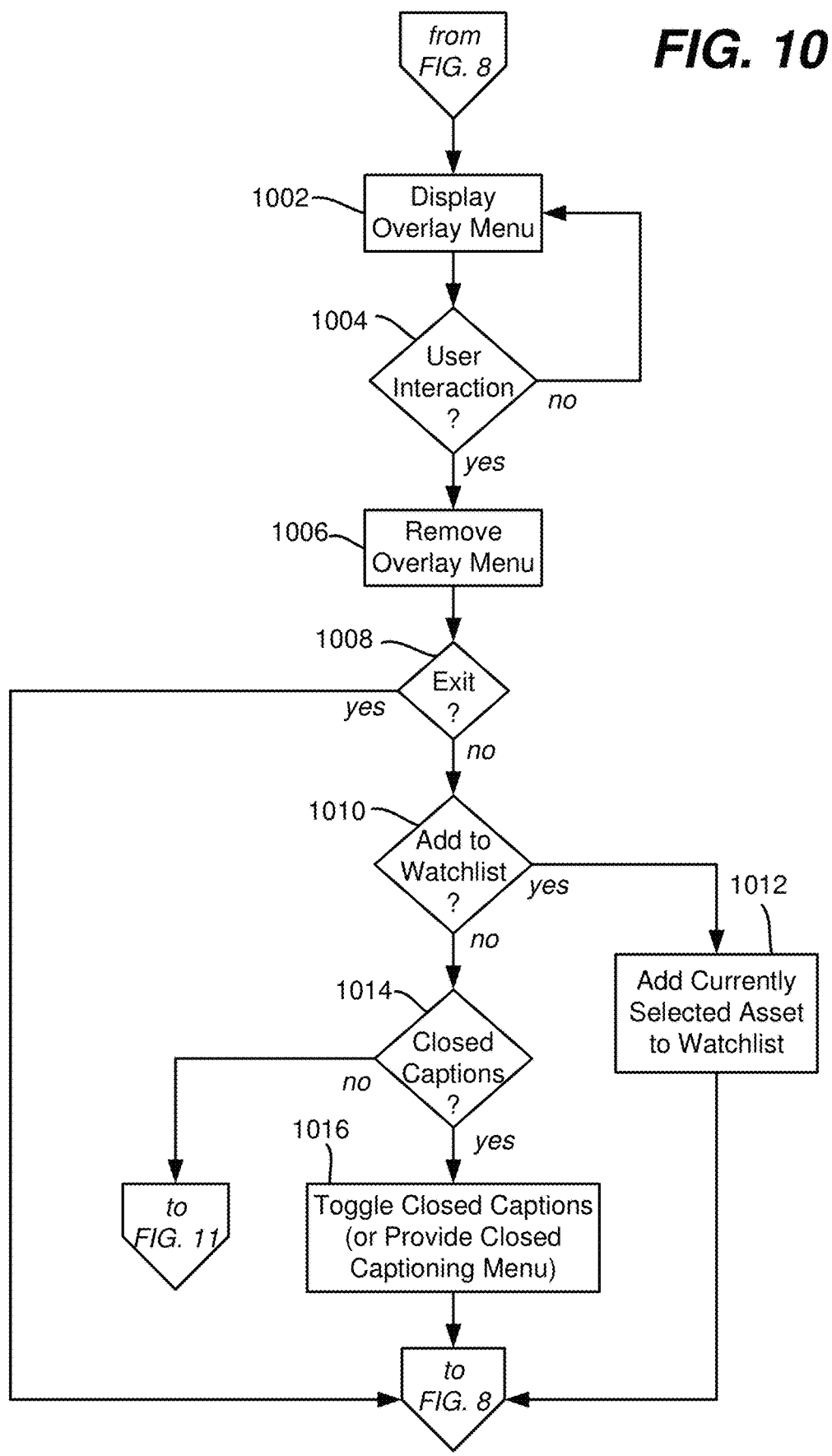

Once the user interacts, further operations represented in FIGS. 8-10 depend on what the user has requested. For example, if the user chooses some mechanism (e.g. a "Back" or "Exit" button) as evaluated in operation 810, operation 812 exits the surf-mode and operation 814 returns to present the previous display to the user, e.g., that of FIG. 2, (with possibly a differently highlighted menu item).

If the user request was for a navigation (e.g., a left, right, up or down command), operation 816 branches to FIG. 9, operation 902. Otherwise, in this example, the operation is directed towards presenting the overlay menu, and the process branches to operation 1002 of FIG. 10.

Thus, FIG. 9 represents handling navigation commands, beginning at operation 902, which represents evaluating whether the navigation command was a Right navigation request, (e.g., a right cursor key, or a channel up command key). If so, operation 904 selects the next asset in the same (current) category, and the process returns to FIG. 8 to play/stream this newly selected asset based on its time offset data relative to the current time.

It should be noted that as represented in FIG. 5, there may not be another asset in the requested direction. For example, if on the "Featured Kids" category at the fifth asset (ASSET 5), a right navigation command can be ambiguous, because there is no sixth asset. In one or more implementations, one rule that resolves the ambiguity is to wrap back to the first asset in the category. Another option in other implementations is to move to the first (or some other) asset in a next category, e.g. ASSET 1 of the "Featured Comedy" category, assuming a next category exists. Yet another option is to not allow such navigation and indicate to the user (e.g., sound an audible beep or the like) that the last asset in the category has been reached. As represented in FIG. 9, the wrap from last-to-first alternative is exemplified at operation 904.

If not a Right navigation command at operation 902, operation 906 evaluates whether the user request was a Left navigation command or a channel down key. If so, operation 908 selects the previous asset in the same category, or in this example wraps to the last asset in the same category if navigating left from the first channel; e.g., ASSET 1 of the "Featured Comedy" category wraps to ASSET 6 of the "Featured Comedy" category if a left navigation request is received.

Another possibility is that the user has requested an Up navigation cursor command or a page up button/command, as evaluated at operation 910. If so, in this example the previous category is selected at operation 912, or if already at the first category, the navigation selection wraps to the last category. Thus, in the example of FIG. 5, the "Featured Movies" category is changed to the "Featured Series" category following an Up navigation command.

With respect to choosing an asset, a correspondingly listed asset in the new category can be selected. Thus, in the example of FIG. 5, if playing the third asset of the "Featured Movies" category (ASSET 3) and navigating up, the third asset in the "Featured Series" category (ASSET 3) can be "surfed to," that is, the third asset can be selected for playing. As an alternative, it is feasible to select the first asset listed in a newly selected category.

If not an Up navigation command (or page up command) at operation 910, then in this example, the request is a Down navigation command, such as via the cursor down arrow or a page down button; (other alternative commands such as "Home," "Back" or "End" can be provided by the system but are not exemplified in this example). Operation 914 selects the next category (or wraps to the first category if already at the last category) for a Down navigation command.

Note that it is possible that there is no correspondingly listed asset in a newly selected category. For example, with reference to FIG. 5, if navigating up from the sixth asset (ASSET 6) of the "Featured Comedy" category, there is no sixth asset in the "Featured Kids" category. In this example, operation 916 evaluates whether such an asset exists in a newly selected category. If not, operation 918 selects the last asset in the newly selected category, e.g., ASSET 5 of the "Featured Kids" category. An alternative is to select the first asset in the newly selected category, or select some other asset in the new category (e.g., randomly or based on profile data). It is also feasible to always select the first or a random, existing asset in a newly selected category at step 912 or 914, rather than the corresponding asset, e.g., navigate down from the third asset (ASSET 3) of the "Featured Movies" category to the first asset, ASSET 1, of the "Featured Kids" category regardless of how many other assets exist in the "Featured Kids" category; (if so, operations 916 and 918 are not needed).

As can be seen, navigation changes the asset (and possibly the category). As such, FIG. 9 returns to FIG. 8, operations 804 and 806, to play the newly selected asset from its appropriate time offset based on the current time.

It should be noted that the navigation handling operations of FIG. 9 are only examples. For example, the device in use may determine what interaction performs which operation. As a more particular example, the operations of FIG. 9 are based on a device with a cursor pad, arrow keys or the like (whether real and/or virtual), possibly along with channel up and down buttons and page up and page down buttons; however a more limited remote control that only has channel up and down buttons can use only those buttons to navigate one surf mode channel at a time (regardless of category). A different remote control can have channel up and down buttons that provide single-surf mode channel navigation to an adjacent channel, along with page up and page down buttons or the like that can change categories (and thus also the surf mode channel). Instead of changing categories, page up and page down commands can instead change the channel by more than one directly previous channel or directly subsequent channel, e.g., change the channel by n channels up or down, respectively, such as five channels; (which may or may not change the category). Thus, surf mode navigation can be performed in many different ways, as long as the keys/buttons/commands correspond to consistent operations as defined to the user.

Figure 11:
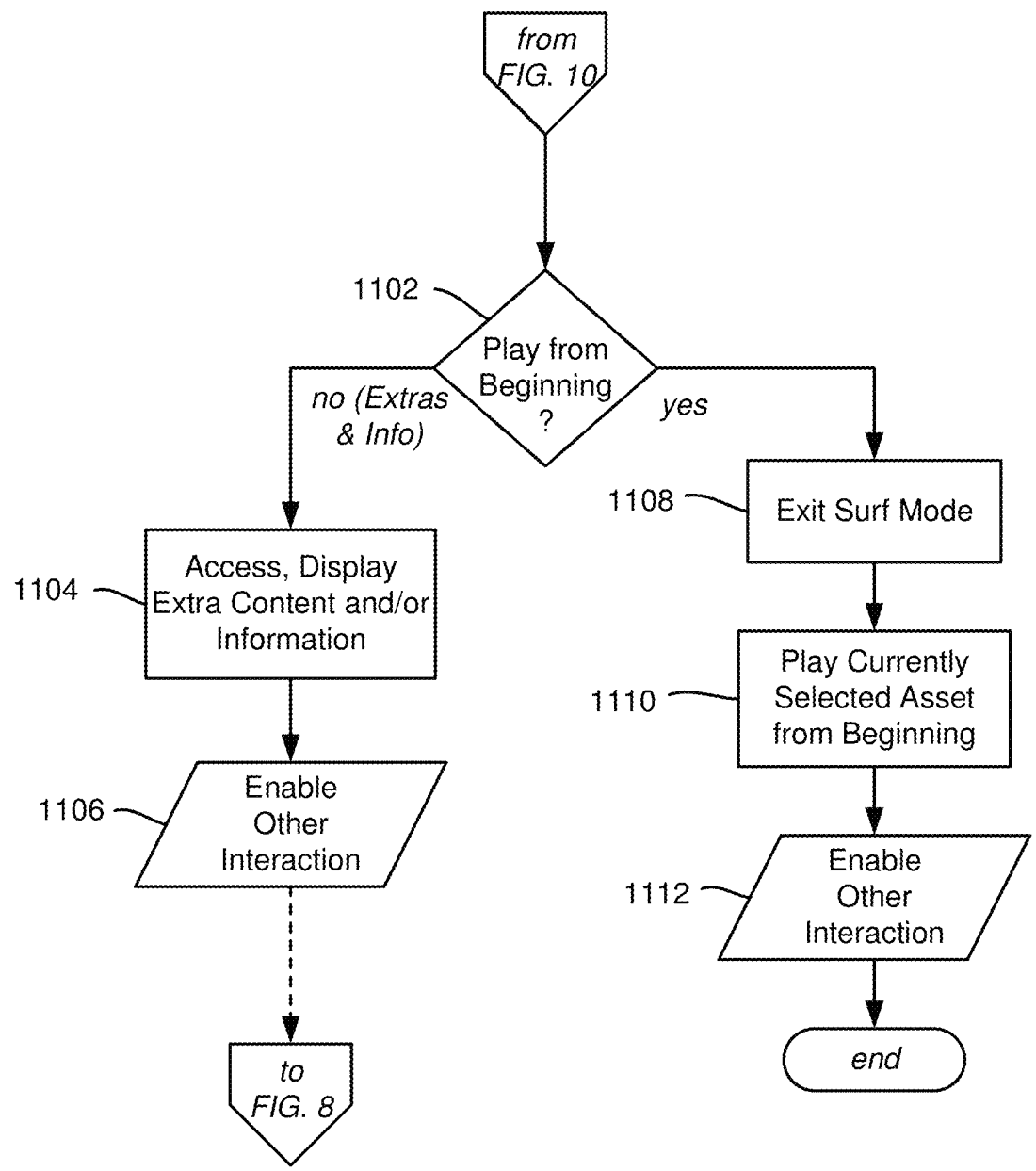

Returning to FIG. 8, if at Operation 810 the request was not a Back command, and at operation 816 the request was not a navigation command, then in this example the request is for the overlay menu to be presented to the user. Example overlay-related operations are represented in FIGS. 10 and 11.

Operation 1002 represents displaying the overlay menu to the user. Operation 1004 represents waiting for user interaction, which when detected, in this example results in operation 1006 removing the overlay menu.

Operation 1008 evaluates whether the interaction was to exit the overly menu, e.g., if inadvertently requested. If so, operation 1008 returns to FIG. 8, operation 806 where the asset continues playing/streaming from its current location. Note that if the asset has ended in the interim, another instance of the asset, or possibly a new asset, has already started in the background; (this is generally true for any operation that can take an indefinite amount of time, including the operations exemplified in FIG. 10).

Another possible overlay menu interaction is to request that the asset be added to the user's watchlist, which in general is a list of one or more assets that the user saves for viewing at some later time. If so, operation 1012 adds the currently selected asset to the watchlist, and returns to FIG. 8, operation 806 where the asset (possibly a different instance or even a different asset) continues playing until further interaction by the user.

Another possible interaction is to turn on (or turn off) closed-captioning. If so, operation 1016 toggles the closed-captioning state from off to on, or vice versa. It is also a feasible alternative to provide a closed-captioning menu by which the user can turn closed-captioning on or off, as well as change characteristics (e.g. character size) of the closed-captioning text and/or background when active. If performed, operation 1016 returns to FIG. 8, operation 806.

Otherwise, the surf mode logic continues to FIG. 11, operation 1102. This operation as exemplified evaluates whether the user has interactively elected to play the asset from the beginning, or present extra information to the user. If extra information is to be presented, operation 1104 accesses this information from a suitable storage location and displays it. Operation 1106 enables other interaction with this display information, e.g. along the user to select a link to additional information, clear the extra information and return, and so on. Note that the content continues playing in the background, although this could change depending on user actions with respect to the additional information being presented; (e.g., a user may choose to see an interview with the director, the user may be able to choose to play from the beginning via a link in the additional information, and so on).

If an operation 1102 the user elects to play the asset from the beginning, then operation 1108 exits surf mode streaming and operation 1110 streams the asset from the beginning. Note that this is one purpose of the surf mode, namely helping users find desired content to stream, instead of (or as a supplement to) conventional grid-based or search-located content. Operation 1112 enables other interaction, e.g., the typical commands associated with an asset selected for streamed playback using any technique, e.g., fast forward, rewind, pause, resume, stream normal speed, jump ahead X minutes, and so on.

In general, with the surf mode the user feels as if he or she has joined or can easily join some content in-progress, similar to broadcast television. If universal time is use, users in different time zones are able to view the same streamed content across the channels at the same progression in the timeline as other users. Note that this can be limited to per-country, region or the like, e.g., one set programming offerings with their respective offsets can be arranged for the United States, another for Europe, yet another for China, and so on.

To fill advance programming, (e.g., the future instances of an asset as in FIG. 6), when an asset is added to or featured on the service, the repeating schedule can auto-populate from a service-specified start date to an end date of the asset's availability within its respective slot. As described herein, including with universal time, the assets can be staggered to simulate randomness in the viewing experience and reduce the amount of simultaneous start and end times between assets of similar lengths.

In this way, linear cable users and the like who are accustomed to the concept of moving through content on television via 'channel surfing' are provided a straightforward way to quickly view streamed video content by scanning through surf mode channels via the technology described herein. As a result, users of digital streaming services are no longer limited to what is often an arduous, frustrating and lengthy process to discover and engage with content.

Indeed, the surf mode technology described herein gives users the option to easily access a video player (e.g., application/browser) that drops a user into a content stream that is (or appears to be) currently in-progress, simulating a live channel. Users are then able to easily 'channel surf' through multiple pieces of content, basically at the push of a button or the like, while also able to navigate to a different thematic category of content. In one more implementations, each user also has enhanced functionality to watch the program from the beginning, or add it to his or her watchlist, from directly within the video player.

Figure 12:
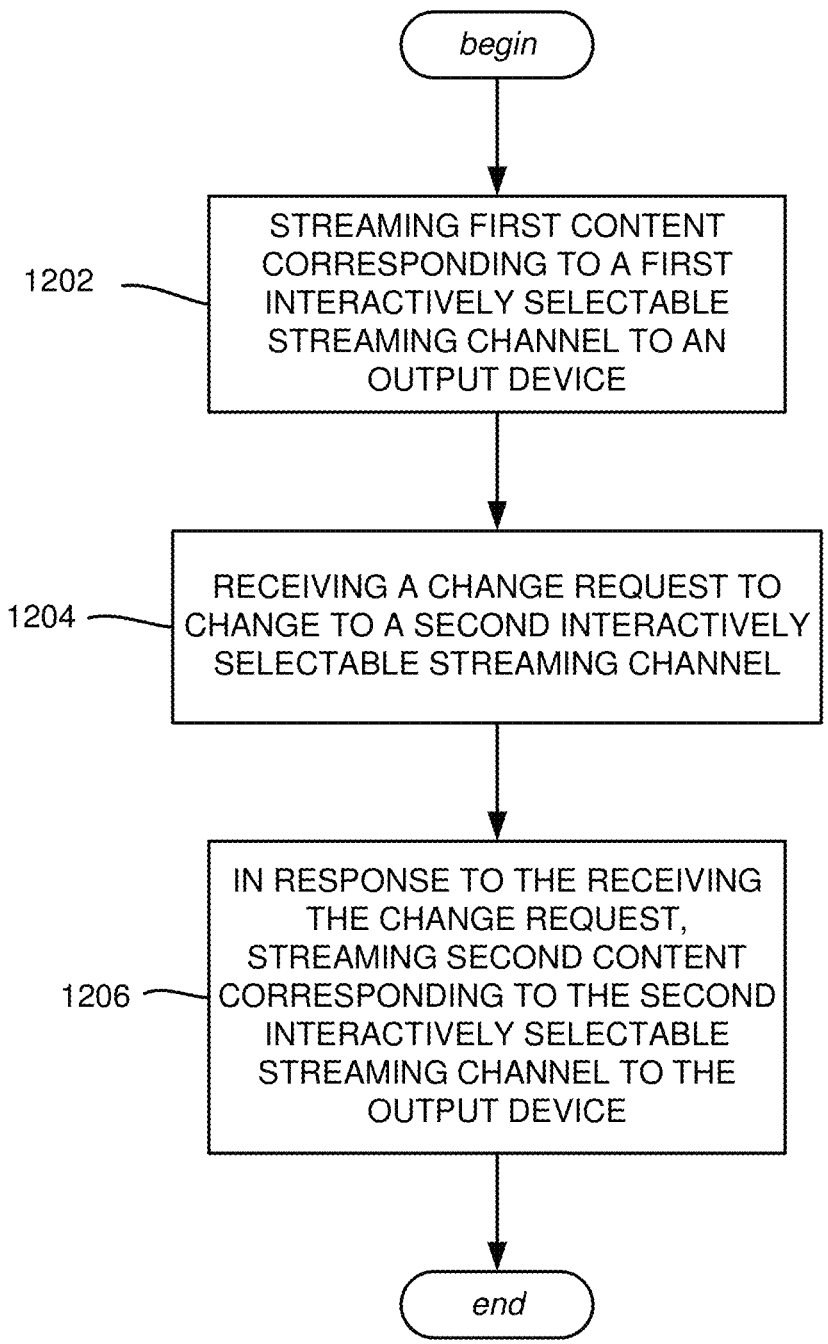
FIG. 12 is a flow diagram of example operations that can be performed with respect to a surf mode of operation for streamed content channels, in accordance with one or more example implementations.

One or more aspects are exemplified in FIG. 12 in the form of operations, comprising streaming first content corresponding to a first interactively selectable streaming channel to an output device (operation 1202). Operation 1204 represents receiving a change request to change to a second interactively selectable streaming channel. Operation 1206 represents, in response to the receiving the change request, streaming second content corresponding to the second interactively selectable streaming channel to the output device.

The output device can comprise a display device; aspects can comprise, displaying an interactive surf mode user interface element representing a surf mode of operation on the display device, detecting interaction directed to interactive surf mode user interface element. The streaming the first content corresponding to the first interactively selectable streaming channel can occur in response to the detecting the interaction with the interactive user interface surf mode element.

Aspects can comprise presenting an interactive menu in conjunction with the streaming of the first content, the interactive menu comprising one or more interactive elements corresponding to one or more actions that are selectable for performing with respect to the first content. The one or more actions comprise at least one of: adding data corresponding to the first content to a watchlist, starting the first content from a beginning point, adjusting a state of closed captioning data that is associated with the first content, and/or presenting extra information associated with the first content.

The second interactively selectable streaming channel can be adjacent the first interactively selectable streaming channel, and receiving the change request to change to the second interactively selectable streaming channel can comprise receiving a channel up or channel down change request.

The first interactively selectable streaming channel can be in a first category, wherein the second interactively selectable streaming channel can be in a second category, and receiving the change request to change to the second interactively selectable streaming channel can comprise receiving a change category change request.

The first streamed content can be associated with a first starting time that is different relative to a second starting time associated with the second streamed content, and streaming the second content can comprise streaming the second content from an offset time based on current time and the second starting time.

Figure 13:
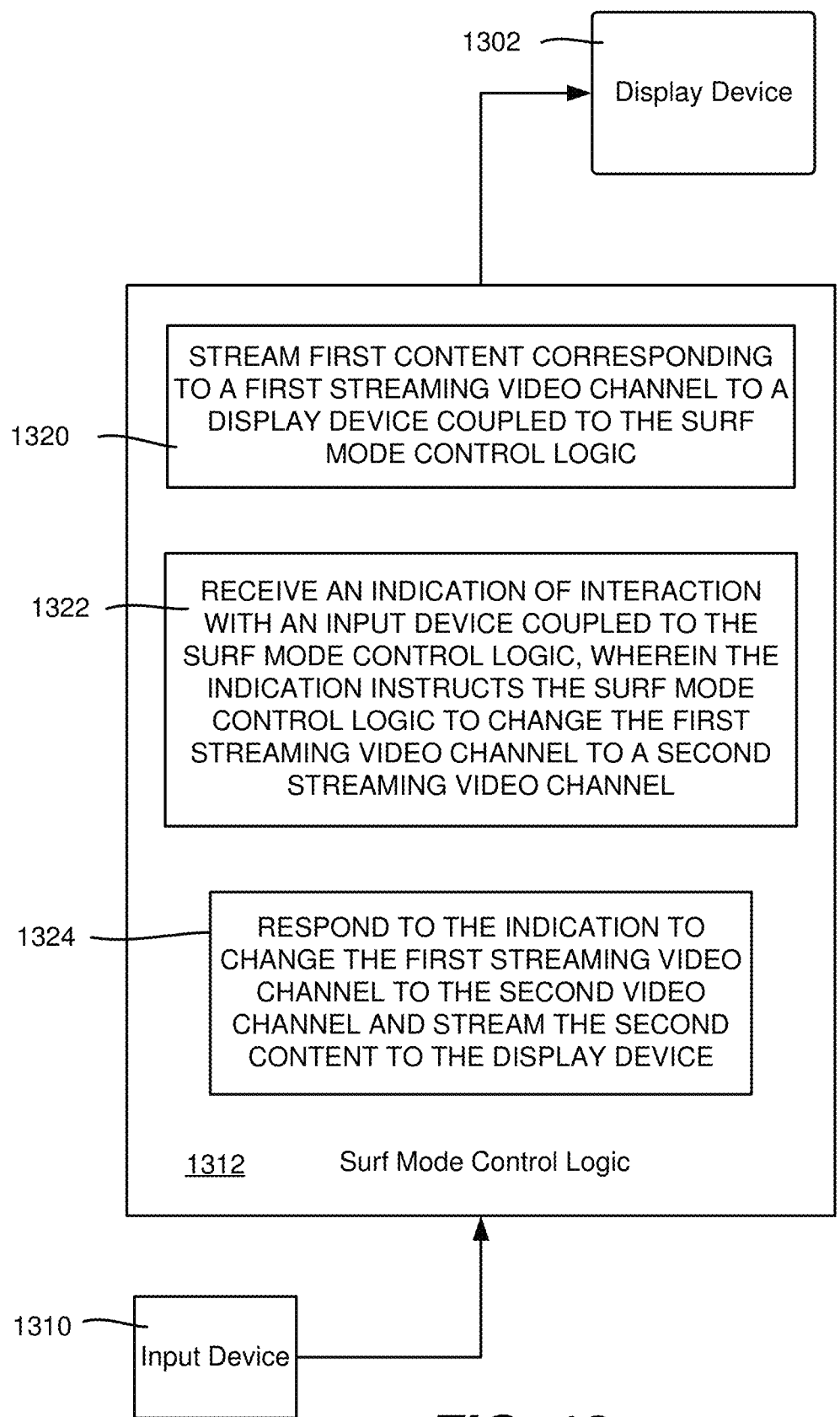
FIG. 13 is a block diagram of surf mode control logic that provides a surf mode of operation for streamed content channels, in accordance with one or more example implementations.

Aspects are represented as a system in FIG. 13, comprising surf mode control logic 1312. The surf mode control logic 1312 can be configured to stream first content corresponding to a first streaming video channel (block 1320) to a display device 1302 coupled to the surf mode control logic 1312, and receive an indication of interaction with an input device 1310 coupled to the surf mode control logic; the indication can instruct (block 1322) the surf mode control logic 1312 to change the first streaming video channel to a second streaming video channel. The surf mode control logic 1312 can respond to the indication to change (block 1324) the first streaming video channel to the second video channel and stream the second content to the display device 1302.

The first streaming video channel, the second streaming video channel and one or more other video channels can be grouped into categories, and the second video channel can be adjacent the first video channel in a common category.

The first streaming video channel can be associated with a first category and the second video channel is channel can be associated with a second category that is different from the first category. The surf mode control logic can receive the indication of the interaction as a command that directs a change in category from the first category to the second category.

The first streaming video channel can be associated with a first starting time and the second video channel can be associated with a second starting time that is different from the first starting time. The first starting time and the second starting time can be related to universal coordinated time.

The surf mode control logic can be further configured to provide a menu of one or more interactive elements in association with the second content, wherein the menu comprises at least one interactive element for selection of at least one of: a watchlist-related operation, a start-related operation to start the second content from a beginning point, a closed captioning-related operation, and/or an extra information presentation operation.

Figure 14:
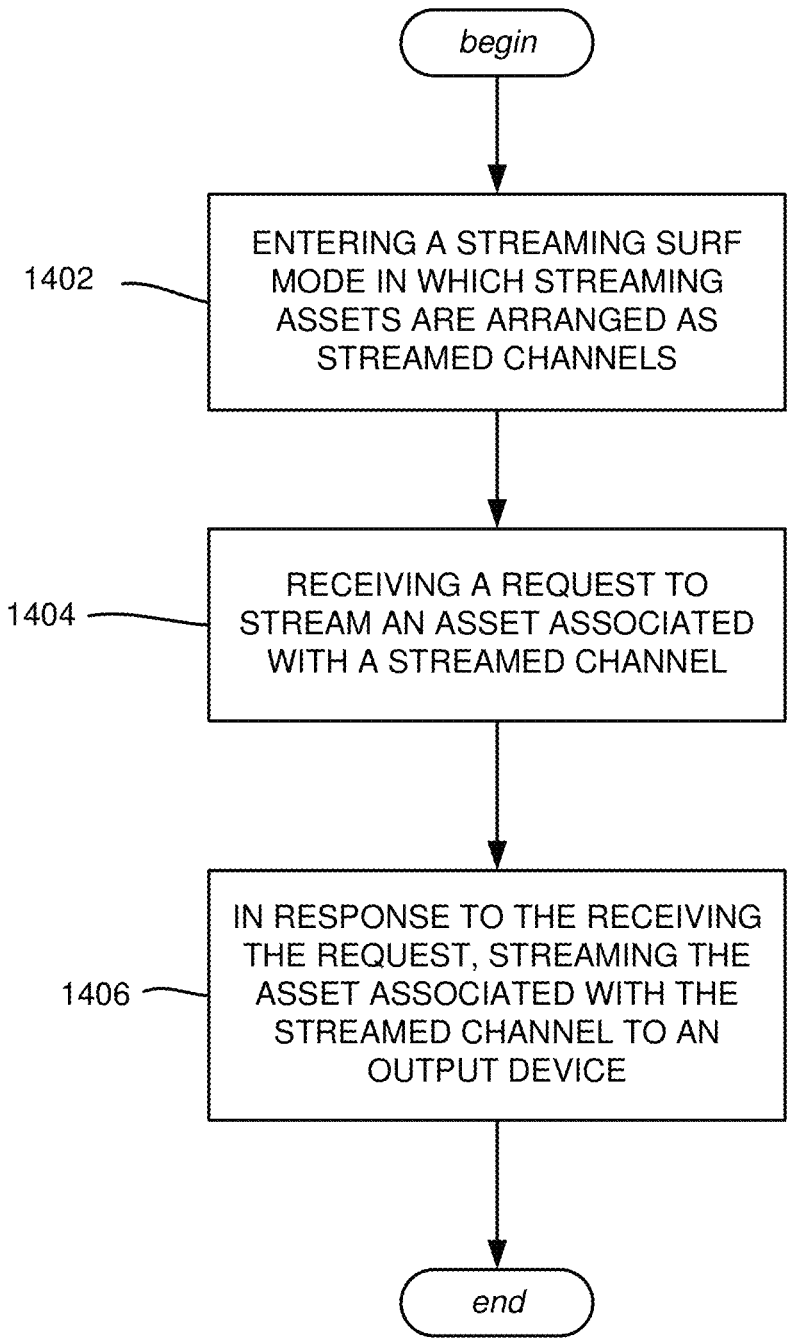
FIG. 14 is a flow diagram of example operations that can be performed to provide a surf mode of operation for streamed content, in accordance with one or more example implementations.

One or more aspects are represented as example operations in FIG. 14, such as executable instructions in a machine-readable storage medium, in which the instructions, when executed by a processor, facilitate performance of the operations. Example operations can comprise entering a streaming surf mode in which streaming assets are arranged as streamed channels (operation 1402), receiving a request to stream an asset associated with a streamed channel (operation 1404), and in response to the receiving the request, streaming the asset associated with the streamed channel to an output device (operation 1406).

The request can be a first request, the asset associated with the streamed channel can be a first asset, the streamed channel can be a first streamed channel, and the operations can further comprise, receiving a second request to change to a second streamed channel, and in response to the receiving the second request, streaming a second asset associated with the second streamed channel to the output device.

The first streamed channel can be arranged to be adjacent the second streamed channel, and receiving the second request to change to the second streamed channel can comprise receiving the second request based on interaction with an input device in which the interaction is directed to changing to a directly previous or a directly subsequent streaming channel.

The first streamed channel can be associated with a first category, the second streamed channel can be associated with a second category, and receiving the second request to change to the second streamed channel can comprise receiving the second request based on interaction with an input device in which the interaction is directed to changing to a different category.

Streaming the asset associated with the streamed channel can comprise determining a starting point within the asset for starting the streaming based on time offset data associated with the asset and a current time value.

Streaming the asset associated with the streamed channel can comprise determining that the asset is already being streamed as an instance of data to a first recipient device, and the streaming the asset associated with the streamed channel to the output device can comprise streaming another instance of the data to a second recipient device corresponding to the output device.

As can be seen, the surf mode of operation for streamed channels provides a beneficial and advantageous way for users to efficiently locate desirable content for streaming. This technology is straightforward for users to engage with and understand, and thus encourages more immediate consumption of video. Surf mode channels and/or categories of channels (and/or a starting channel) can be made available (e.g., customized) based on different user and/or group profile data, popularity of content, and so forth.

The techniques described herein can be applied to any device or set of devices (machines) capable of running programs and processes. It can be understood, therefore, that personal computers, laptops, handheld, portable and other computing devices and computing objects of all kinds including cell phones, tablet/slate computers, gaming/entertainment consoles and the like are contemplated for use in connection with various implementations including those exemplified herein. Accordingly, the general purpose computing mechanism described below in FIG. 15 is but one example of a computing device.

Implementations can partly be implemented via an operating system, for use by a developer of services for a device or object, and/or included within application software that operates to perform one or more functional aspects of the various implementations described herein. Software may be described in the general context of computer executable instructions, such as program modules, being executed by one or more computers, such as client workstations, servers or other devices. Those skilled in the art will appreciate that computer systems have a variety of configurations and protocols that can be used to communicate data, and thus, no particular configuration or protocol is considered limiting.

Figure 15:
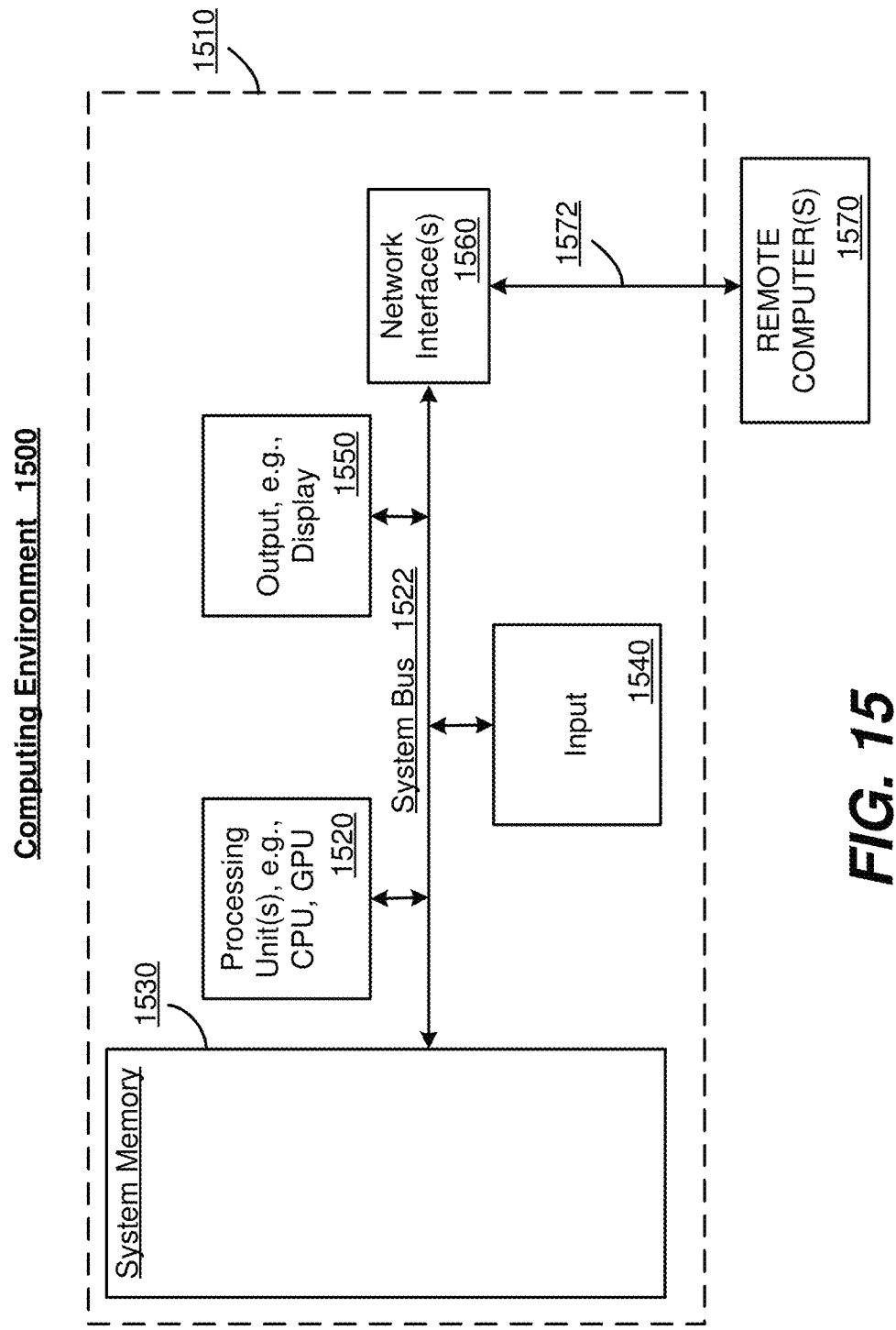
FIG. 15 is a block diagram representing an example computing environment into which aspects of the subject matter described herein may be incorporated.

FIG. 15 thus illustrates an example of a suitable computing system environment 1500 in which one or aspects of the implementations described herein can be implemented, although as made clear above, the computing system environment 1500 is only one example of a suitable computing environment and is not intended to suggest any limitation as to scope of use or functionality. In addition, the computing system environment 1500 is not intended to be interpreted as having any dependency relating to any one or combination of components illustrated in the example computing system environment 1500.

With reference to FIG. 15, an example device for implementing one or more implementations includes a general purpose computing device in the form of a computer 1510. Components of computer 1510 may include, but are not limited to, a processing unit 1520, a system memory 1530, and a system bus 1522 that couples various system components including the system memory to the processing unit 1520.

Computer 1510 typically includes a variety of machine (e.g., computer) readable media and can be any available media that can be accessed by a machine such as the computer 1510. The system memory 1530 may include computer storage media in the form of volatile and/or nonvolatile memory such as read only memory (ROM) and/or random access memory (RAM), and hard drive media, optical storage media, flash media, and so forth. By way of example, and not limitation, system memory 1530 may also include an operating system, application programs, other program modules, and program data.

A user can enter commands and information into the computer 1510 through one or more input devices 1540. A monitor or other type of display device is also connected to the system bus 1522 via an interface, such as output interface 1550. In addition to a monitor, computers can also include other peripheral output devices such as speakers and a printer, which may be connected through output interface 1550.

The computer 1510 may operate in a networked or distributed environment using logical connections to one or more other remote computers, such as remote computer 1570. The remote computer 1570 may be a personal computer, a server, a router, a network PC, a peer device or other common network node, or any other remote media consumption or transmission device, and may include any or all of the elements described above relative to the computer 1510. The logical connections depicted in FIG. 15 include a network 1572, such as a local area network (LAN) or a wide area network (WAN), but may also include other networks/buses. Such networking environments are commonplace in homes, offices, enterprise-wide computer networks, intranets and the Internet.

As mentioned above, while example implementations have been described in connection with various computing devices and network architectures, the underlying concepts may be applied to any network system and any computing device or system in which it is desirable to implement such technology.

Also, there are multiple ways to implement the same or similar functionality, e.g., an appropriate API, tool kit, driver code, operating system, control, standalone or downloadable software object, etc., which enables applications and services to take advantage of the techniques provided herein. Thus, implementations herein are contemplated from the standpoint of an API (or other software object), as well as from a software or hardware object that implements one or more implementations as described herein. Thus, various implementations described herein can have aspects that are wholly in hardware, partly in hardware and partly in software, as well as wholly in software.

The word "example" is used herein to mean serving as an example, instance, or illustration. For the avoidance of doubt, the subject matter disclosed herein is not limited by such examples. In addition, any aspect or design described herein as "example" is not necessarily to be construed as preferred or advantageous over other aspects or designs, nor is it meant to preclude equivalent example structures and techniques known to those of ordinary skill in the art. Furthermore, to the extent that the terms "includes," "has," "contains," and other similar words are used, for the avoidance of doubt, such terms are intended to be inclusive in a manner similar to the term "comprising" as an open transition word without precluding any additional or other elements when employed in a claim. Still further, "or" is intended to mean "and/or" (e.g., as in a Boolean logic "OR" operation, "A or B" is to be interpreted as true if "A" is true, "B" is true or "A and B" are both true) unless nonsensical in its context or specifically indicated as otherwise intended.

As mentioned, the various techniques described herein may be implemented in connection with hardware or software or, where appropriate, with a combination of both. As used herein, the terms "component," "module," "system" and the like are likewise intended to refer to a computer-related entity, either hardware, a combination of hardware and software, software, or software in execution. For example, a component may be, but is not limited to being, a process running on a processor, a processor, an object, an executable, a thread of execution, a program, and/or a computer. By way of illustration, both an application running on a computer and the computer can be a component. One or more components may reside within a process and/or thread of execution and a component may be localized on one computer and/or distributed between two or more computers.

The aforementioned systems have been described with respect to interaction between several components. It can be appreciated that such systems and components can include those components or specified sub-components, some of the specified components or sub-components, and/or additional components, and according to various permutations and combinations of the foregoing. Sub-components can also be implemented as components communicatively coupled to other components rather than included within parent components (hierarchical). Additionally, it can be noted that one or more components may be combined into a single component providing aggregate functionality or divided into several separate sub-components, and that any one or more middle layers, such as a management layer, may be provided to communicatively couple to such sub-components in order to provide integrated functionality. Any components described herein may also interact with one or more other components not specifically described herein but generally known by those of skill in the art.

In view of the example systems described herein, methodologies that may be implemented in accordance with the described subject matter can also be appreciated with reference to the flowcharts/flow diagrams of the various figures. While for purposes of simplicity of explanation, the methodologies are shown and described as a series of blocks, it is to be understood and appreciated that the various implementations are not limited by the order of the blocks, as some blocks may occur in different orders and/or concurrently with other blocks from what is depicted and described herein. Where non-sequential, or branched, flow is illustrated via flowcharts/flow diagrams, it can be appreciated that various other branches, flow paths, and orders of the blocks, may be implemented which achieve the same or a similar result. Moreover, some illustrated blocks are optional in implementing the methodologies described herein.

While the invention is susceptible to various modifications and alternative constructions, certain illustrated implementations thereof are shown in the drawings and have been described above in detail. It should be understood, however, that there is no intention to limit the invention to the specific forms disclosed, but on the contrary, the intention is to cover all modifications, alternative constructions, and equivalents falling within the spirit and scope of the invention.

In addition to the various implementations described herein, it is to be understood that other similar implementations can be used or modifications and additions can be made to the described implementation(s) for performing the same or equivalent function of the corresponding implementation(s) without deviating therefrom. Still further, multiple processing chips or multiple devices can share the performance of one or more functions described herein, and similarly, storage can be effected across a plurality of devices. Accordingly, the invention is not to be limited to any single implementation, but rather is to be construed in breadth, spirit and scope in accordance with the appended claims.

What is claimed is:

1. A method comprising:

generating a first interactive guide for a first user, wherein the first interactive guide comprises first live broadcast channels comprising first live broadcast content arranged according to a first live broadcast schedule in a first local time zone of the first user, and the first interactive guide comprises interactively selectable streaming channels comprising streamed content arranged according to a coordinated universal time;

generating a second interactive guide for a second user, wherein the second interactive guide comprises second live broadcast channels comprising second live broadcast content arranged according to a second live broadcast schedule in a second local time zone of the second user, and the second interactive guide comprises the interactively selectable streaming channels comprising the streamed content arranged according to the coordinated universal time;

streaming first streamed content corresponding to a first interactively selectable streaming channel of the interactively selectable streaming channels to a first output device associated with the first user;

receiving a change request in the first interactive user guide to change to a second interactively selectable streaming channel of the interactively selectable streaming channels comprising second streamed content that is not currently playing; and in response to the receiving the change request, streaming the second streamed content corresponding to the second interactively selectable streaming channel to the first output device, wherein the streaming the second streamed content comprises initiating playback of the second streamed content at an offset time within the second streamed content from a beginning of the second streamed content.

2. The method of claim 1, further comprising, displaying an interactive surf mode user interface element representing a surf mode of operation on the first interactive guide, detecting interaction directed to the interactive surf mode user interface element, and wherein the streaming the first streamed content corresponding to the first interactively selectable streaming channel occurs in response to the detecting the interaction with the interactive user interface surf mode element.

3. The method of claim 1, wherein the first interactive guide comprises one or more interactive elements corresponding to one or more actions that are selectable for performing with respect to the first streamed content.

4. The method of claim 3, wherein the one or more actions comprise at least one of: adding data corresponding to the first streamed content to a watchlist, starting the first streamed content from a beginning point, adjusting a state of closed captioning data that is associated with the first streamed content, or presenting extra information associated with the first streamed content.

5. The method of claim 1, further comprising streaming the second streamed content corresponding to the second interactively selectable streaming channel to a second output device associated with the second user time synchronized with streaming the second streamed content to the first output device.

6. The method of claim 1, wherein the first interactively selectable streaming channel is in a first category, wherein the second interactively selectable streaming channel is in a second category, and wherein the receiving the change request to change to the second interactively selectable streaming channel comprises receiving a change category change request.

7. The method of claim 1, wherein the first streamed content is associated with a first starting time that is different relative to a second starting time associated with the second streamed content, and wherein the streaming the second content comprises streaming the second content from the offset time based on a current time and the second starting time.

8. A system, comprising:
a processor; and
a memory communicatively coupled to the processor, the memory having stored therein computer-executable instructions, comprising:
user interface control logic configured to:
generate a first interactive guide for a first user, wherein the first interactive guide comprises first live broadcast video channels comprising first live broadcast content arranged according to a first live broadcast schedule in a first local time zone of the first user, and the first interactive guide comprises streaming video channels comprising streamed content arranged according to a coordinated universal time, and
generate a second interactive guide for a second user, wherein the second interactive guide comprises second live broadcast video channels comprising second live broadcast content arranged according to a second live broadcast schedule in a second local time zone of the second user, and the second interactive guide comprises the streaming video channels comprising the streamed content arranged according to the coordinated universal time; and
surf mode control logic configured to:
stream first streamed content corresponding to a first streaming video channel of the streaming video channels to a display device coupled associated with the first user to the surf mode control logic, receive an indication of interaction with an input device coupled to the surf mode control logic, wherein the indication instructs the surf mode control logic to change the first streaming video channel to a second streaming video channel of the streaming video channels comprising second streamed content that is not currently playing, and respond to the indication to change the first streaming video channel to the second video channel and stream the second streamed content to the display device, wherein the streaming the second streamed content comprises initiating playback of the second streamed content at an offset time within the second streamed content from a beginning of the second streamed content.

9. The system of claim 8, wherein the first streaming video channel, the second streaming video channel and one or more other video channels are grouped into categories, and wherein the second streaming video channel is adjacent the first streaming video channel in a common category.

10. The system of claim 8, wherein the first streaming video channel is associated with a first category and the second streaming video channel is channel is associated with a second category that is different from the first category.

11. The system of claim 10, wherein the surf mode control logic receives the indication of the interaction as a command that directs a change in category from the first category to the second category.

12. The system of claim 8, wherein the first streaming video channel is associated with a first starting time and the second streaming video channel is associated with a second starting time that is different from the first starting time.

13. The system of claim 12, wherein the first starting time and the second starting time are related to the coordinated universal time.

14. The system of claim 8, wherein the surf mode control logic is further configured to provide a menu of one or more interactive elements in association with the second content, wherein the menu comprises at least one interactive element for selection of at least one of: a watchlist-related operation, a start-related operation to start the second streamed content from a beginning point, a closed captioning-related operation, or an extra information presentation operation.

15. A non-transitory machine-readable medium, comprising executable instructions that, when executed by a processor, facilitate performance of operations, the operations comprising:
generating a first interactive guide for a first user, wherein the first interactive guide comprises first live broadcast channels comprising first live broadcast content arranged according to a first live broadcast schedule in a first local time zone of the first user, and the first interactive guide comprises interactively selectable streaming channels comprising streamed content arranged according to a coordinated universal time;
generating a second interactive guide for a second user, wherein the second interactive guide comprises second live broadcast channels comprising second live broadcast content arranged according to a second live broadcast schedule in a second local time zone of the second user, and the second interactive guide comprises the interactively selectable streaming channels comprising the streamed content arranged according to the coordinated universal time;
streaming first streamed content corresponding to a first interactively selectable streaming channel of the interactively selectable streaming channels to a first output device associated with the first user;
receiving a change request in the first interactive user guide to change to a second interactively selectable streaming channel of the interactively selectable streaming channels comprising second streamed content that is not currently playing; and in response to the receiving the change request, streaming the second streamed content corresponding to the second interactively selectable streaming channel to the first output device, wherein the streaming the second streamed content comprises initiating playback of the second streamed content at an offset time within the second streamed content from a beginning of the second streamed content.

16. The non-transitory machine-readable medium of claim 15, the operations further comprising, displaying an interactive surf mode user interface element representing a surf mode of operation on the first interactive guide, detecting interaction directed to the interactive surf mode user interface element, and wherein the streaming the first streamed content corresponding to the first interactively selectable streaming channel occurs in response to the detecting the interaction with the interactive user interface surf mode element.

17. The non-transitory machine-readable medium of claim 15, wherein the first interactive guide comprises one or more interactive elements corresponding to one or more actions that are selectable for performing with respect to the first streamed content.

18. The non-transitory machine-readable medium of claim 17, wherein the one or more actions comprise at least one of: adding data corresponding to the first streamed content to a watchlist, starting the first streamed content from a beginning point, adjusting a state of closed captioning data that is associated with the first streamed content, or presenting extra information associated with the first streamed content.

19. The non-transitory machine-readable medium of claim 15, further comprising streaming the second streamed content corresponding to the second interactively selectable streaming channel to a second output device associated with the second user time synchronized with streaming the second streamed content to the first output device.

* * * * *